(12) United States Patent
Ostap et al.

(10) Patent No.: US 12,407,790 B2
(45) Date of Patent: Sep. 2, 2025

(54) OPTIMAL GROUPING DURING VIDEO CONFERENCING BY LOSS BASED TECHNIQUES

(71) Applicant: Logitech Europe S.A., Lausanne (CH)

(72) Inventors: Oleg Ostap, Camas, WA (US);
Kostiantyn Verhun, Ternopil (UA);
Henry Levak, San Mateo, CA (US);
Kristopher Glenn Perry, Camas, WA (US); Andrzej Jan Szewczyk, Cracow (PL); Ihor Dutchak, Skalat (UA);
Ankita Verma, Vancouver, WA (US);
Ihor Okhrimenko, Kyiv (UA)

(73) Assignee: Logitech Europe S.A., Lausanne (CH)

( * ) Notice: Subject to any disclaimer, the term of this patent is extended or adjusted under 35 U.S.C. 154(b) by 235 days.

(21) Appl. No.: 18/222,315

(22) Filed: Jul. 14, 2023

(65) Prior Publication Data

US 2024/0422289 A1 Dec. 19, 2024

Related U.S. Application Data

(60) Provisional application No. 63/472,800, filed on Jun. 13, 2023.

(51) Int. Cl.
*H04N 7/15* (2006.01)
*G06T 7/11* (2017.01)
(Continued)

(52) U.S. Cl.
CPC ............... *H04N 7/15* (2013.01); *G06T 7/11* (2017.01); *G06V 20/49* (2022.01); *H04N 5/2628* (2013.01);
(Continued)

(58) Field of Classification Search
CPC ........ H04N 7/15; H04N 5/2628; H04N 5/278; G06V 20/49; G06T 7/11; G06T 2207/20132
(Continued)

(56) References Cited

U.S. PATENT DOCUMENTS 11,350,029 B1 5/2022 Ostap et al.
11,403,811 B1 * 8/2022 Upchurch .............. G06N 3/084
(Continued)

*Primary Examiner* — Binh Kien Tieu
(74) *Attorney, Agent, or Firm* — Patterson + Sheridan, LLP

(57) ABSTRACT

Embodiments herein generally relate to video-conferencing systems, and more particularly a method and system for optimally grouping and auto-cropping a field of view (FOV) of the video-conferencing system based on predefined preferences, such as preferences determined by a user. Generally, embodiments of the disclosure provided herein include a video-conferencing system that is configured to update the presentation of participants within a video conference to regularly determine the optimal presentation of the participants at any given moment in time based on predetermined preferences, while mitigating defects and related unwanted distractions typically generated in the video conference presentation due to the changes provided in the updates. Embodiments of the disclosure allow the predetermined preferences to each be given an importance level rating so as to allow the presentation of the participants to be optimally provided without making unnecessary and/or distracting updates to the video conference presentation, and also help resolve conflicting or competing attributes of related preferences.

20 Claims, 14 Drawing Sheets

(51) Int. Cl.
  *G06V 20/40* (2022.01)
  *H04N 5/262* (2006.01)
  *H04N 5/278* (2006.01)
(52) U.S. Cl.
  CPC ... *H04N 5/278* (2013.01); *G06T 2207/20132* (2013.01)
(58) Field of Classification Search
  USPC .................................................. 348/14.08
  See application file for complete search history.

(56) References Cited

U.S. PATENT DOCUMENTS

| | | | | |
|---|---|---|---|---|
| 11,611,600 B1* | 3/2023 | Ifrach | .................. | H04L 65/403 |
| 2006/0082656 A1* | 4/2006 | Ochiai | ............... | H04N 23/6815 |
| | | | | 348/207.99 |
| 2013/0162752 A1* | 6/2013 | Herz | ........................ | H04N 7/15 |
| | | | | 348/E7.083 |
| 2016/0134838 A1* | 5/2016 | Tangeland | ............. | H04N 7/152 |
| | | | | 348/14.09 |
| 2016/0173821 A1* | 6/2016 | De Magalhaes | ....... | H04N 23/61 |
| | | | | 348/14.08 |
| 2018/0121762 A1* | 5/2018 | Han | ....................... | G06V 10/44 |
| 2019/0304102 A1* | 10/2019 | Chen | ....................... | G06N 20/00 |
| 2021/0365707 A1* | 11/2021 | Mao | ....................... | G06V 20/46 |
| 2022/0129665 A1* | 4/2022 | Xue | ...................... | G06V 10/454 |
| 2023/0351727 A1* | 11/2023 | Balavalikar Krishnamurthy | ........ | |
| | | | | H04N 5/2628 |
| 2024/0020952 A1* | 1/2024 | Xu | ............................. | G06T 7/12 |
| 2024/0338924 A1* | 10/2024 | Bhatt | .................. | G06V 10/273 |
| 2024/0422289 A1* | 12/2024 | Ostap | .................... | H04N 7/147 |
| 2025/0022136 A1* | 1/2025 | Zeng | ........................ | G06N 3/08 |
| 2025/0063137 A1* | 2/2025 | Murata | .................. | H04N 7/152 |
| 2025/0063138 A1* | 2/2025 | Suzuki | .................. | G06V 20/40 |

* cited by examiner

OPTIMAL GROUPING DURING VIDEO CONFERENCING BY LOSS BASED TECHNIQUES

CROSS-REFERENCE TO RELATED APPLICATION

This patent application claims the benefit of U.S. Provisional Patent Application No. 63/472,800, filed Jun. 13, 2023, which is incorporated by reference herein.

BACKGROUND

Field

Embodiments of the present disclosure generally relate to a video conferencing systems and related video conferencing methods.

Description of the Related Art

Typically, video-conferencing systems are suitable to allow one or groups of participants to visually conference in different spaces located at different geographical locations. In recent years, video-conferencing has been increasing in popularity due to improvements in high-speed internet, declining costs of video conferencing equipment, and a global need for remote collaboration. As the popularity of video-conferencing has increased, so has the demand for sophisticated video-conferencing systems. Users are now expecting sophisticated video-conferencing systems that are costly, and therefore, found in designated conference areas to be cheaper, available, flexible, and easily installed in any environment used for video conferencing.

Video-conferencing systems have an auto-framing feature that is generally used to detect activity in a video-conferencing environment and adjust the boundaries of the field-of-view (FOV) displayed to remote participants. For example, a video-conferencing system may be able to detect an initial number of users and ensure all the users are clearly in the frame displayed to remote users. Then as the location and/or quantity of users change, the video conferencing system can adjust the FOV of a camera.

Unfortunately, current auto-cropping technologies, used to detect and single out individuals positioned within a FOV of a video conferencing system camera (e.g., auto-framed FOV) for presentation within a video conference, require strict rules or definitions to detect and single out an individual within the camera's FOV. Moreover, current auto-cropping technologies are commonly performed in a sequential manner, which reduces the speed with which the auto-cropping process is performed and creates competing auto-cropping rules or decision factors. For example, first the video-conferencing device may change the FOV of the camera to capture someone outside of the frame first, and then change the FOV to center the users in the FOV. However, fixing an initial problem (i.e., a person is outside of the frame) may lead to another problem. For example, there is no guarantee that in the second step when the users are centered in the FOV will not cause a user to be partially (or fully outside of the frame). Stated differently as each issue in the auto-cropping process is sequentially fixed, a new problem may arise which creates a new iteration of adjustments.

Accordingly, there is a need in the art for methods and a system that allow video-conferencing to auto-crop based on needs indicated by a user, and that solves the other problems highlighted above.

SUMMARY

Embodiments of the disclosure include a computer implemented method, comprising generating, by a sensor, a video stream that comprises a series of frames that each include a plurality of objects positioned within a conference environment; determining the objects captured within at least one frame of the video stream; assigning one or more croppings to each of the objects in the at least one frame of the video stream, wherein the assigning of the one or more croppings to each of the objects comprises: determining a plurality of combinations of croppings that include at least one of the objects in the at least one frame; and assigning a first cropping configuration to each of the determined croppings, wherein each of the assigned first cropping configurations include at least one object; adjusting each assigned first cropping configuration to determine a preferred cropping configuration for each of the determined croppings based on a cropping function, wherein the cropping function comprises two or more individual cropping loss values and a respective cropping weight; and transmitting the adjusted croppings to an electronic device for display on a display device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments herein generally relate to video-conferencing systems, and more particularly a method and system for optimally grouping and auto-cropping one or more portions of a field of view (FOV) of a video-conferencing environment based on predefined preferences, such as preferences determined by a user. Generally, embodiments of the disclosure provided herein include a video-conferencing system that is configured to determine optimal croppings of participants within a video conference so that the croppings can be used in the presentation of the participants within a video conference. The video-conferencing system disclosed herein is configured to update the presentation of participants within a video conference so that the optimal presentation of the participants is determine at any given moment in time based on predetermined preferences, while mitigating defects and related unwanted distractions typically generated in the video conference presentation due to the changes provided in the updates. Embodiments of the disclosure allow the predetermined preferences to each be given an importance level rating so as to allow the presentation of the participants to be optimally provided without making unnecessary and/or distracting updates to the video conference presentation, and also help resolve conflicting or competing attributes of related preferences.

Video-Conferencing System

Figure 1A:
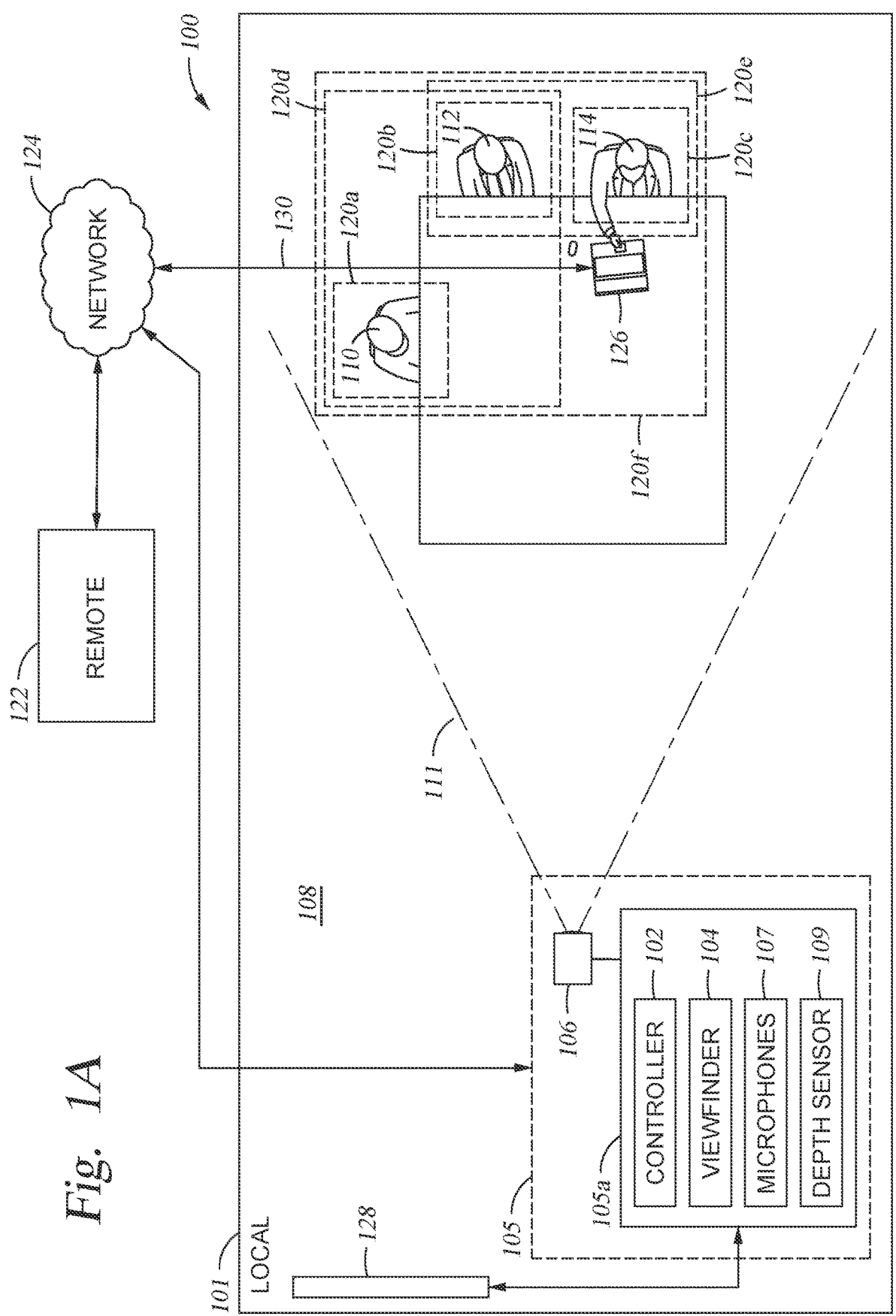
FIG. 1A is a schematic representation of a video conferencing system disposed within a video conferencing environment, determining a combination of croppings, according to one or more embodiments.

FIG. 1A is a schematic representation of a video conferencing system 100 disposed within a video conferencing environment, according to one or more embodiments. As illustrated in FIG. 1A, a video conferencing environment, such as a local conference endpoint 101, is linked to one or more remote conference endpoints, such as the remote endpoint 122, over a network 124 that facilitates communication therebetween. As shown, the local conference endpoint 101 is located in a conference environment 108, such as a designated meeting room, having an area large enough to accommodate multiple conference room presentation objects or combinations of conference room presentation objects. For example, the objects or combinations of objects may include a first participant 110, a second participant 112, and a third participant 114. In some embodiments, the conference environment 108 may include at least one hitchhiker. A hitchhiker may be defined herein as a portion of an object included in a cropping without having the entire width of the object in the cropping. A hitchhiker may also be defined as an unwanted or unintended object entirely included in a cropping. For example, if the shoulder of the third participant 114 is included in cropping 120b, the third participant 114 may be considered a hitchhiker with respect to cropping 120b. In some embodiments, objects within a video conferencing environment can include conference room participants and non-human objects, such as a whiteboard, which are each part of the generated presentation of the conference room environment. Here, the local conference endpoint 101 includes a video conferencing system 105 that includes a video conference processing section 105a and at least one camera device 106 for capturing a video stream of the conference environment 108, a user device 126 for transmitting the video stream to the remote endpoint 122 and receiving a video stream therefrom, and a display device 128 for displaying the received video stream. The video stream will include a series of frames 118 (FIGS. 3A-8). The terms "camera" and "sensor" are generally used interchangeably throughout the disclosure provided herein, and neither term is intended to be limiting as to the scope of the disclosure provided herein since, in either case, these terms are intended to generally describe a device that is at least able to generate a stream of visual images (e.g., frames 118) based on a field-of-view (FOV) of one or more optical components (e.g., lenses), and an image sensor (e.g., CCD, CMOS sensor, etc.) disposed within the "camera" or "sensor." In some examples, the cameras or sensors are capable of delivering video at a 720p, 2K video resolution, or UHD (2160 p) video resolution, or DCI 4K (i.e., 4K) video resolution, or 8K or greater video resolution.

The network 124 generally represents any data communications network suitable for the transmission of video and audio data (e.g., the Internet). A communication link 130 is used to support the transmission of video conference feeds that include audio and video streams between the local conference endpoint 101, the network 124, and/or the remote endpoint 122. The communication link 130 may be formed on a network that is connected to a Local Area Network (LAN) present in each video conference location and/or across multiple video conference locations on a Wide Area Network (WAN).

In one embodiment, the communication link 130 utilizes a wired or wireless communication technique to transmit data between the video conferencing locations. Wireless communication techniques can include but are not limited to a cellular phone network, WiFi network, satellite communication network, or other useful wireless communication techniques. Wired communication techniques may include but are not limited to fiber, cable, or DSL type data transmission methods/technologies.

The video conferencing system 105 includes a camera device 106, one or more microphones 107, and a system controller 102. In some embodiments, the video conferencing system 105 also includes a viewfinder device 104 that is used by the system controller 102 to monitor activity in the conference environment 108, e.g., to detect the locations of conference object(s) within the conference environment 108. The viewfinder device 104 may be equipped with a lens and an image sensor to provide an image for processing to the system controller 102. The camera device 106 is used by the system controller 102 to frame a desired field of view (FOV) 111 of camera device 106 based on the detected locations and/or activities of the objects and capture a video stream of the desired view for display at the remote endpoint 122. In some embodiments, the output from the camera device 106 (e.g., video stream) is used by the system controller 102 to monitor activity in the conference environment 108, such as to detect the locations of conference object(s) within the conference environment 108.

Figure 1B:
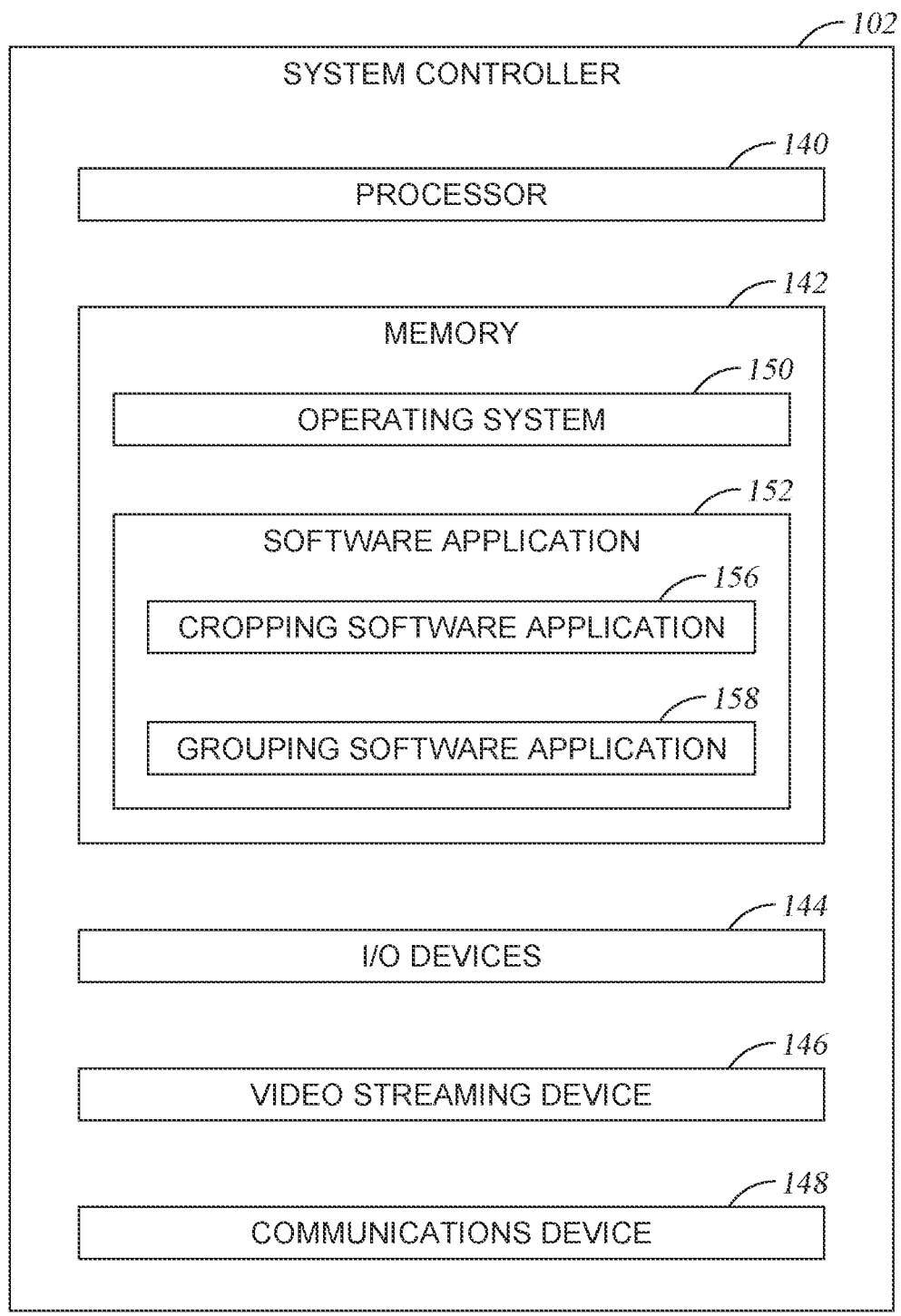
FIG. 1B illustrates is a schematic representation of a system controller of the video conferencing system depicted in FIG. 1A, according to one or more embodiments.

FIG. 1B illustrates is a schematic representation of a system controller 102 of the video conferencing system 105 depicted in FIG. 1A, according to one or more embodiments.

In various embodiments, the system controller 102 includes a processor 140, memory 142, input/output (I/O) devices 144, a video streaming device 146, and a communications device 148, which are operably coupled to one another using one or more support circuits (not shown). In some embodiments, a combination of two or more of the processor 140, memory 142, I/O devices 144, video streaming device 146, and the communications device 148 are integrally formed with one another on a single substrate, e.g., to form a system on a chip (SOC) device.

The processor 140 may be any one or combination of a programmable central processing unit (CPU), a graphics processing unit (GPU), a digital signal processor (DSP), an image signal processor (ISP) that is a specialized DSP used for image processing, a programmable gate array (FPGA), an application-specific integrated circuit (ASIC), a neural network coprocessor, or other hardware implementation(s) suitable for performing the methods set forth herein, or portions thereof. The memory 142, coupled to the processor 140, is non-transitory and represents any non-volatile type of memory of a size suitable for storing one or a combination of an operating system 150 and one or more software applications 152.

Examples of suitable memory that may be used as the memory 142 include readily available memory devices, such as random access memory (RAM), flash memory, a hard disk, or a combination of different hardware devices configured to store data. In some embodiments, memory 142 includes memory devices external to the system controller 102 and in communication therewith. In some embodiments, at least one of the one or more software applications 152 are executable by the processor 140 to perform one or more of the methods set forth herein. The one or more software applications may include a cropping software application 156 and a grouping software application 158 that are configured to be executed by the processor 140.

As described above, conventionally, auto-cropping portions of the FOV 111 of the camera device is done sequentially, which is computationally intensive, and often leads to the process of providing a desired presentation of the video conferencing environment from one set of problems to a next set of problems. As discussed above, embodiments of the disclosure provided herein, include a video conferencing system 105 that is configured to determine an optimal presentation of the video conferencing environment by at least adjusting the cropping and grouping of one or more objects or combinations of objects in the conference environment based on predetermined preferences that are stored in memory of the system controller 102. As described herein, the video conferencing system is configured to first execute the cropping software application to determine a combination of croppings, or defined portions of a video frame within a video stream (i.e., sequence of video frames) that includes one or more objects or object groups, to determine a preferred combination of croppings that are to-be used in a presentation of the video conference environment. Each cropping is a region of interest that corresponds to at least a portion of an object that is desired for inclusion into the to-be transmitted video stream that is used in the presentation of the video conferencing environment delivered locally and/or to one or more other video conferencing locations. For example, each cropping is illustrated as a rectangular box surrounding at least a portion of an object. However any desired shape may be used for each cropping and each cropping may be used to surround any desired portion of each object (i.e., participant).

The system controller 102 is configured to determine each potential combination of groupings and croppings for objects or combinations of objects in the conference environment 108. Each combination of croppings includes at least one cropping. Each of the objects are included in at least one cropping of the group of croppings. Each of the croppings includes at least one object. For example, one potential combination of croppings include croppings 120a-120c, as shown in FIG. 1A. A potential combination of croppings includes croppings 120a and 120e. A potential combination of croppings includes croppings 120c and 120d. A potential combination of croppings includes cropping 120f. The system controller 102 determines every possible combination of croppings, and thus the number of combinations of croppings can exceed the four combinations discussed above. After determining each cropping, the system controller 102 adjusts the each of the croppings to determine a preferred cropping based on a cropping formula, which is described further below. Schematic representations of a method for determining the preferred cropping are illustrated in FIGS. 3-7.

After determining the preferred cropping, the system controller 102 determines a preferred grouping of the object s in the conferencing environment based on a grouping formula and a maximum quantity of groups. Schematic representations of a method for determining the preferred grouping are illustrated in FIGS. 7-14.

Figure 7:
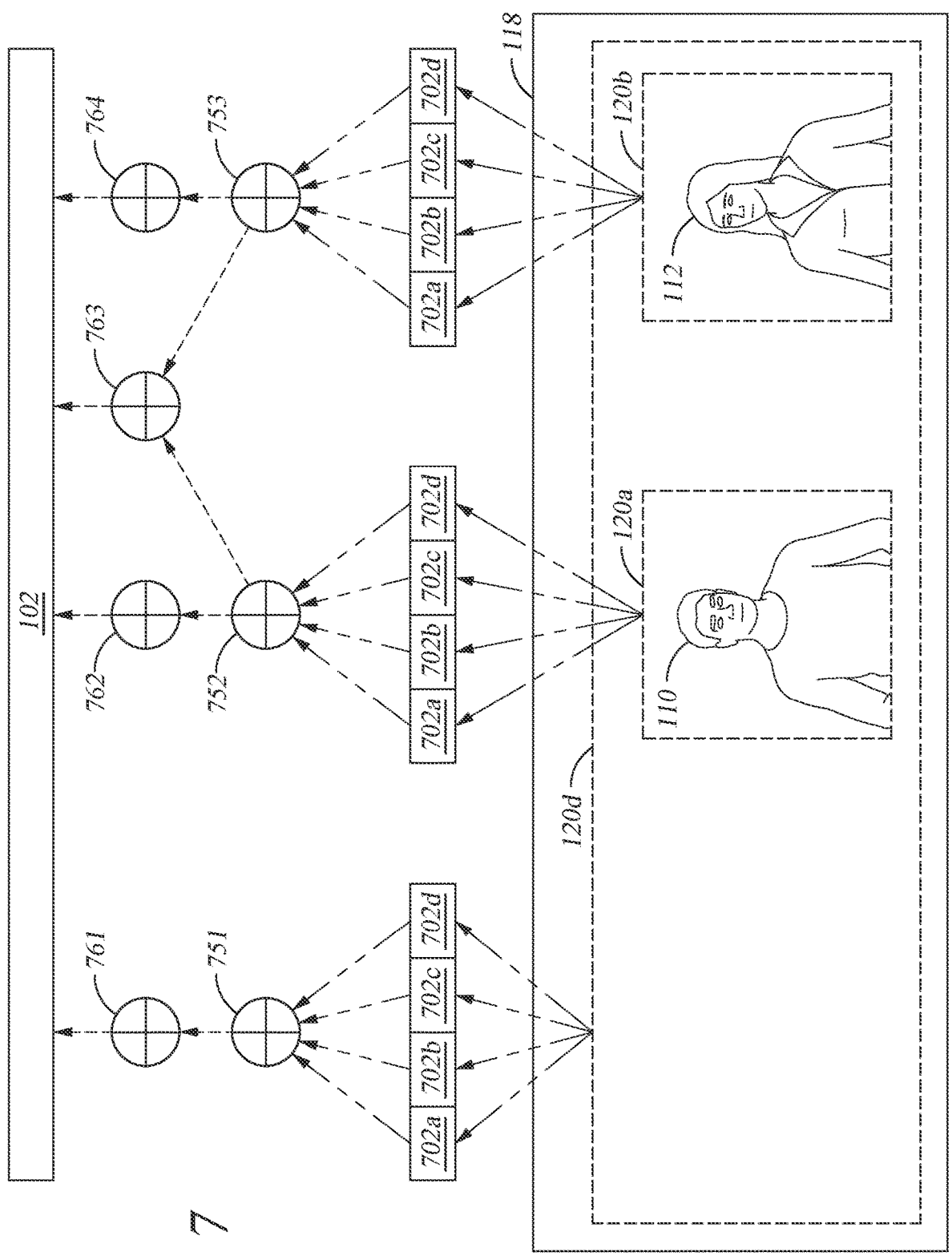
FIG. 7 is a schematic representation of a process of determining a total combined cropping loss value according to one or more embodiments.
Figure 8:
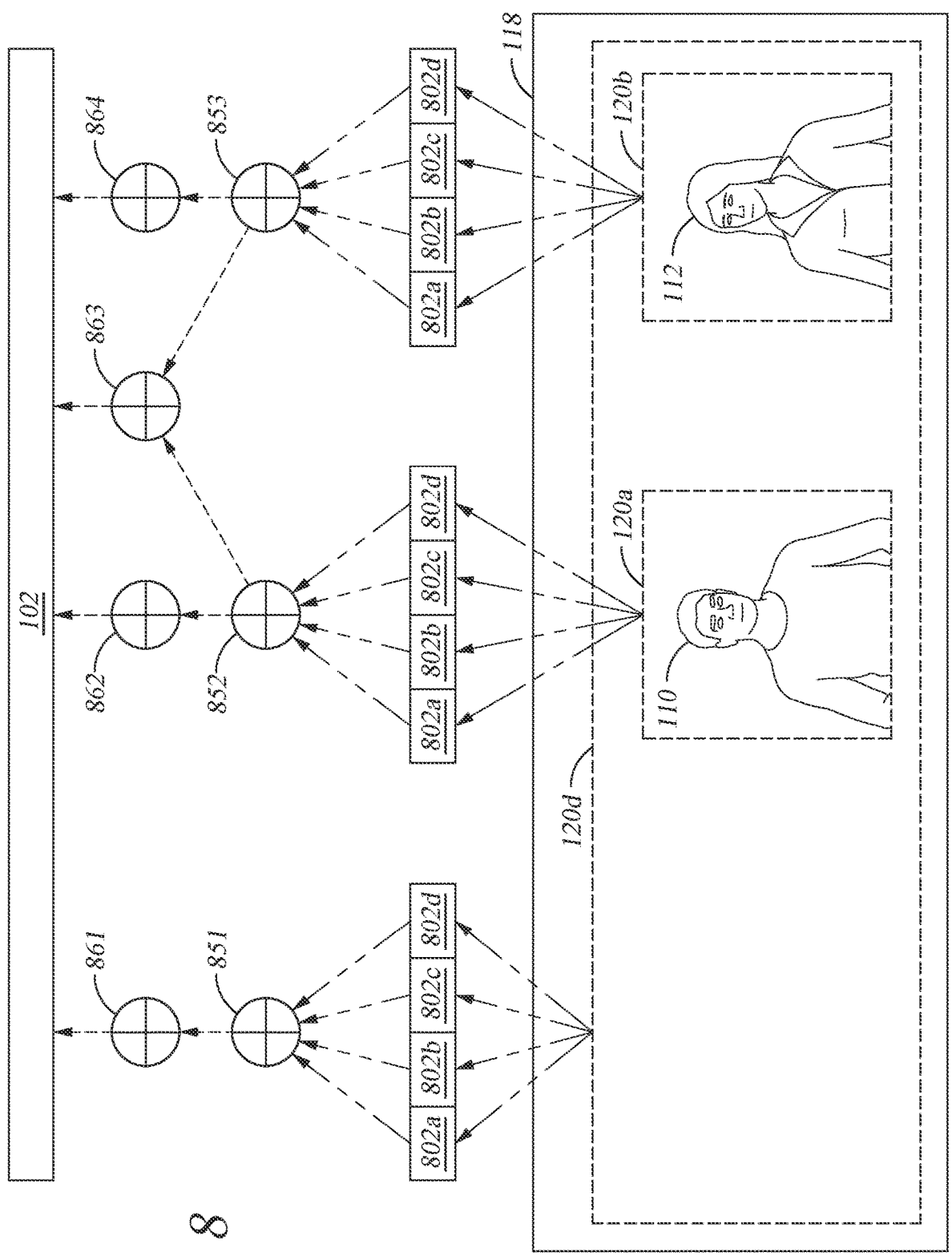
FIG. 8 is an example schematic representation of a process of determining a total determining a total combined grouping loss value that is based on the determination of individual grouping loss values according to one or more embodiments.

As will be discussed further below, FIG. 7 is an example schematic representation of a process of determining total combined cropping loss values 761-764 that is based on the determination of weighted individual cropping loss values 751, 752, and 753, according to one or more embodiments. FIG. 8 is an example schematic representation of a process of determining a total combined grouping loss value that is based on the determination of individual grouping loss values 851, 852, and 853, according to one or more embodiments.

Video Conferencing Methods

Figure 2:
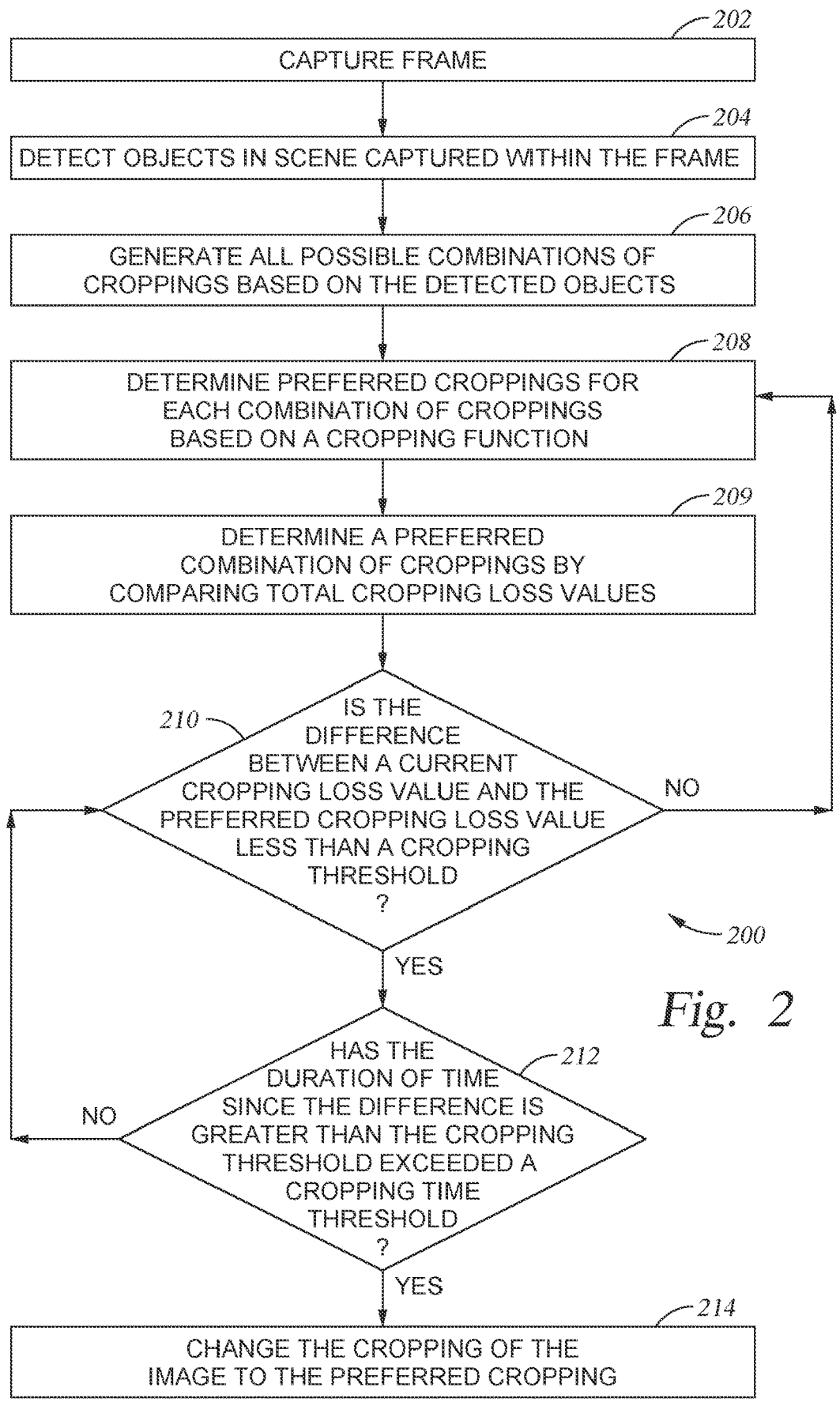
FIG. 2 is a diagram illustrating a method, according to one or more embodiments, for adjusting a to-be-transmitted view (display view) of a video stream of a conference environment.

FIG. 2 is a diagram illustrating a method 200 according to one or more embodiments, for adjusting a to-be-transmitted view (display view) of a video stream of a conference environment 108 based on a state of the conference environment 108, e.g., the number and locations of objects detected therein. The method 200 may be performed using the video conferencing system 105 described above or any other suitable video conferencing system where automatic grouping and framing of more than one region of interest is desired. Aspects of the method 200 are schematically illustrated in FIGS. 3-7.

In general, the method 200 is performed using one or more instructions which are executed by use of the processor 140 and resides in the memory 142 of the system controller 102. In some embodiments, a software application running on the system controller is configured to perform each of the activities performed during the completion of method 200.

At activity 202, the method 200 begins by capturing a frame. In one example, the frame is based on a plurality of survey frames. In various embodiments, capturing a frame includes initiating a video conference session by surveying the conference environment 108 by acquiring a plurality of video frames within the generated video stream. These initial video frames are often referred to herein as survey frames. In some embodiments, the video stream is generated using the camera device 106. Typically, the survey frames are analyzed at the beginning of the video-conferencing session to detect objects, such as conference participants 110-114, and periodically throughout the video-conferencing session to detect changes in the video-conferencing session, such as participants leaving, participants changing location, new participants joining, changes in participant activity (changes in who is speaking) and shifting participant engagement levels. Analysis of the survey frames generates survey data which is analyzed by the system controller 102.

At activity 204, the system controller 102 detects each of the objects in the scene captured within the frame (i.e., within the FOV 111). In one example, the objects are participants in the video conference. For example, as shown in FIG. 1A, the system controller 102 determines the first participant 110, the second participant 112, and the third participant 114 are captured within the FOV 111 of the camera device 106. In some embodiments, the system controller 102 utilizes a participant detection algorithm that is used to detect an object and define a cropping around for each object (e.g., participant) based detecting known or regular shapes of a portion of the object (e.g., participant's head, participant's shoulders, etc.) that is desired for inclusion in the to-be-transmitted video stream (conference video). In some embodiments, the system controller 102 further comprises a thermal sensor (not shown), such as an IR sensor used to detect a thermal signature of a participant. In those embodiments, the participant detection process may comprise determining the visible higher temperature portion(s) corresponding to the conference participants.

At activity 206, the system controller 102 generates all possible combinations of croppings based on the detected objects. As discussed above, a cropping includes defined portions of a video frame within a video stream (i.e., sequence of video frames) that includes one or more objects. Therefore, based on the number of objects determined in activity 204, the total number of possible combinations of croppings will generally be equal to $2^N-1$ possibilities, where N is equal to the number of objects. However, the useful and/or desired number of croppings can be less than the total number of possible combinations of croppings, since croppings that are formed between two objects that include an intervening object are generally not useful for determining the optimal croppings due to at least redundancy with other determined croppings. For example, a cropping including the first participant 110 and the third participant 114 must include the second participant 112, which will be covered by a cropping that includes all three participants (e.g., cropping 102d in FIG. 1A). Each object or groups of objects are included in at least one cropping of each combination of croppings. Each of the croppings includes at least one participant, or at least one object of interest, which in some cases can include non-human objects, such as a whiteboard within the video conference room. Stated differently, each participant or object of interest is included in one cropping in each combination of croppings. Each cropping is a region of interest that corresponds to a portion of an object that is desired for inclusion into the to-be transmitted video stream for use in the presentation of at least a portion of the video conferencing environment. For example, each cropping is illustrated as a rectangular box surrounding the upper body portion of each participant. However, any desired shape may be used for each cropping and each cropping may be used to surround any desired portion of each object of interest or participant, such as only the head and shoulders of the participant. For example, as illustrated in FIG. 1, each of the croppings include at least one of the first participant 110, the second participant 112, and the third participant 114. The attributes of each of the croppings applied to the objects or groups of objects can be initially set by use of initial cropping attributes stored in memory. The attributes of each cropping that are defined by the initial cropping attributes can include, but are not limited to, the size, shape, aspect ratio and alignment of the cropping relative to the object or objects.

At activity 208, the system controller 102 determines preferred croppings for each combination of croppings based on a cropping function. In various embodiments, the attributes of each of the croppings is adjusted until a preferred set of attributes (e.g., size and position) for each cropping is determined. Each combination of croppings is adjusted based on a cropping function that includes a plurality of cropping attributes. As will be described in more detail below, the preferred configuration of a cropping is the combination of cropping attributes that minimize the value of the cropping loss function.

The cropping loss function is used to generate a total combined cropping loss value for each combination of croppings. The total combined cropping loss value for each combination of croppings is determined by determining a set of individual cropping loss values, which are also referred to herein as individual cropping losses, for each possible cropping in each combination of croppings based on a defined set of cropping attributes. For example, a set of individual cropping loss values may be determined for croppings 120a-120f, which are illustrated in FIG. 1A. Each set of individual cropping loss values include individual cropping loss values that are determined by use of defined cropping attributes and their associated cropping weights. As will be discussed further below, examples of cropping attributes include, but are not limited to, asymmetry of objects captured in each cropping, FOV restriction, the use of free space, whether each cropping is larger than the optimal cropping size, and hitchhiker presence. The discussions related to examples of possible cropping attributes, such as the cropping attributes relating to FIGS. 3A-3B, 4A-4C, 5A-5B and 6A-6C, is provided below.

In some embodiments, and for ease of discussion, each individual cropping loss value for each of the cropping attributes is determined in the negative. Stated differently, the higher the cropping loss value the less desirable a defined attribute of a cropping is versus a lower cropping loss value. Moreover, the higher an individual cropping loss value, the worse the cropping is with respect to the corresponding cropping attribute. For example, the more off-center (e.g., asymmetrical) participant(s) are in a cropping, the higher the individual cropping loss value corresponding to asymmetry of objects. In one example, each individual cropping loss value for each cropping attribute may range from a value between 0 and 100 with 0 indicating zero penalty and 100 indicating a maximum penalty. In some embodiments, the range of values of the cropping loss value between the minimum and maximum values is defined by a linear scale. In other embodiments, the maximum penalty that can be achieved is not limited. Examples of how each of these cropping attributes are determined are illustrated in FIGS. 3-6. While the discussion provided herein primarily utilizes a negative scale for the cropping loss value comparisons one skilled in the art would understand that a positive scale (e.g., higher cropping loss value is more desirable) could alternately be used to achieve the same determination of a preferred cropping within a group of croppings.

Figure 3A:
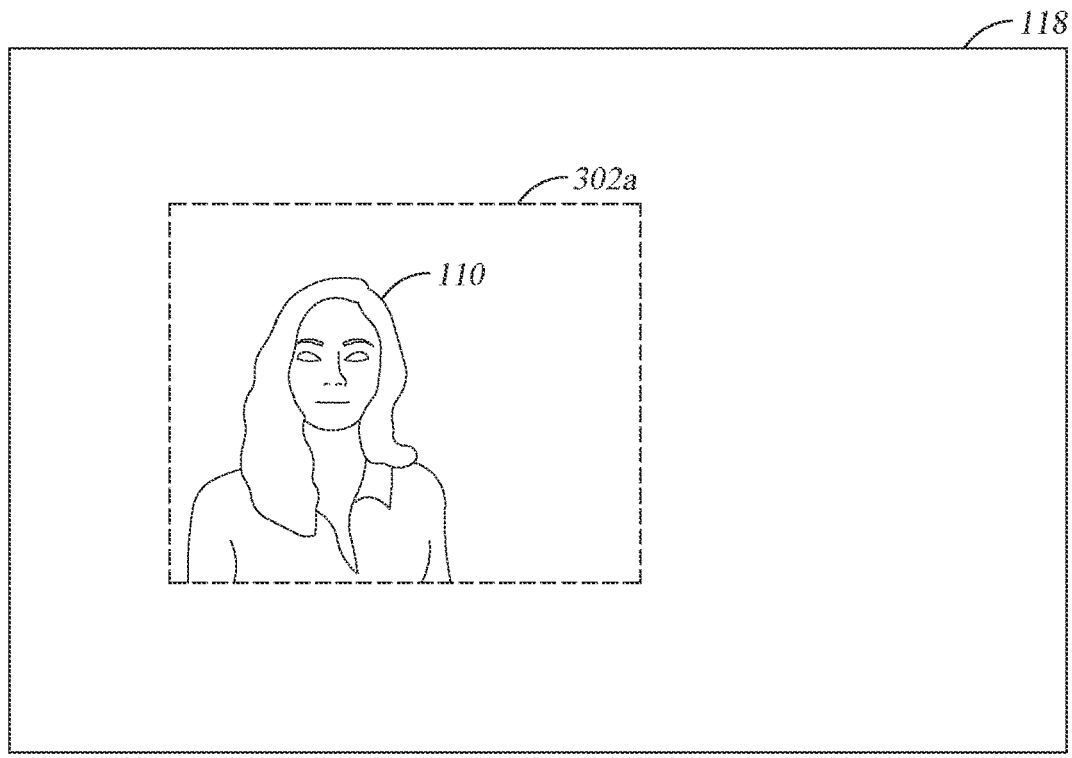
FIGS. 3A-3B are schematic representations of croppings that illustrate how individual cropping loss values can vary due to the asymmetry of objects in a cropping, according to one or more embodiments.
Figure 3B:
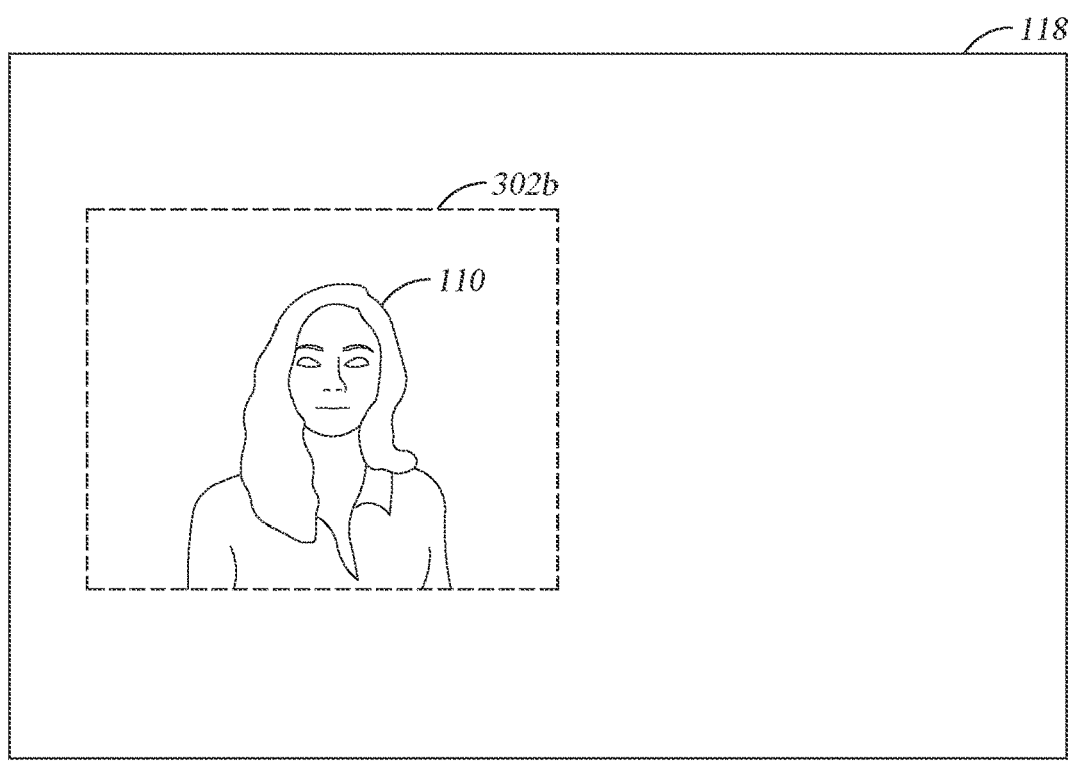

FIGS. 3A-3B are example schematic representations of different examples that can be used to determine an individual cropping loss value corresponding to asymmetry of objects according to one or more embodiments. Typically, the more off-center, or asymmetrical, objects or a group of objects (participant(s)) are within the initially determined cropping (e.g., activity 206) or adjusted cropping (e.g., activity 208), the less desirable the cropping, so a higher penalty (e.g., higher loss value) should be assessed. Therefore, the more centered participant(s) are within a cropping, the lower the individual cropping loss value corresponding to asymmetry of objects. Referring to FIGS. 3A-3B, in frame 118 within a video stream includes the first participant 110 within cropping 302a is off-center relative to the border or edge (e.g., dashed lines) of the cropping 302a, whereas in cropping 302b, the first participant 110 is perfectly centered within the border or edge. For ease and clarity of discussion, in the examples provided herein the frame 118 relates to the FOV 111 of the camera device 106. Therefore, the individual cropping loss value corresponding to asymmetry of objects for cropping 302a is higher than the individual cropping loss value corresponding to asymmetry of objects for cropping 302b. In one example, the individual cropping loss value for the cropping 302a may have a value of 70 versus the individual cropping loss value for the cropping 302b may have a value of zero or 1.

Figure 4A:
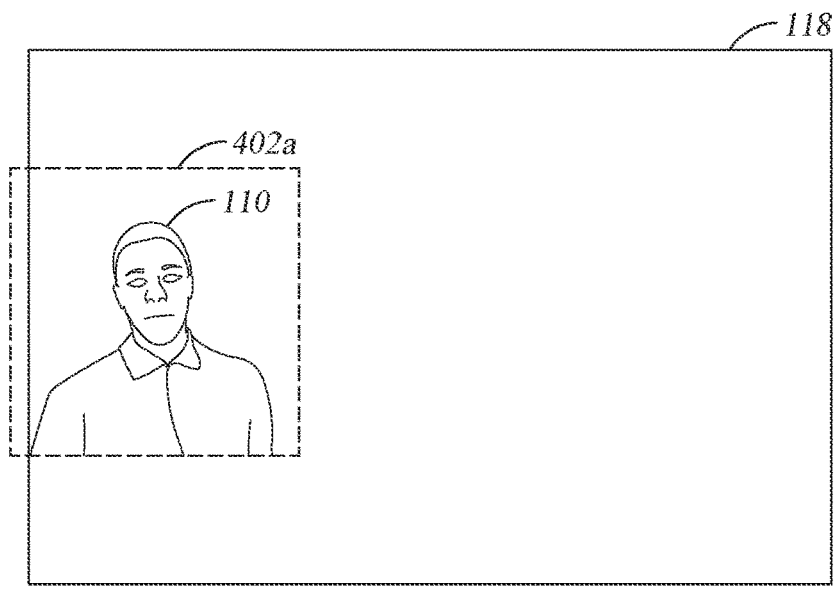
FIGS. 4A-4C are schematic representations of croppings that illustrate how individual cropping loss values can vary due to field-of-view (FOV) restriction in a cropping, according to one or more embodiments.
Figure 4B:
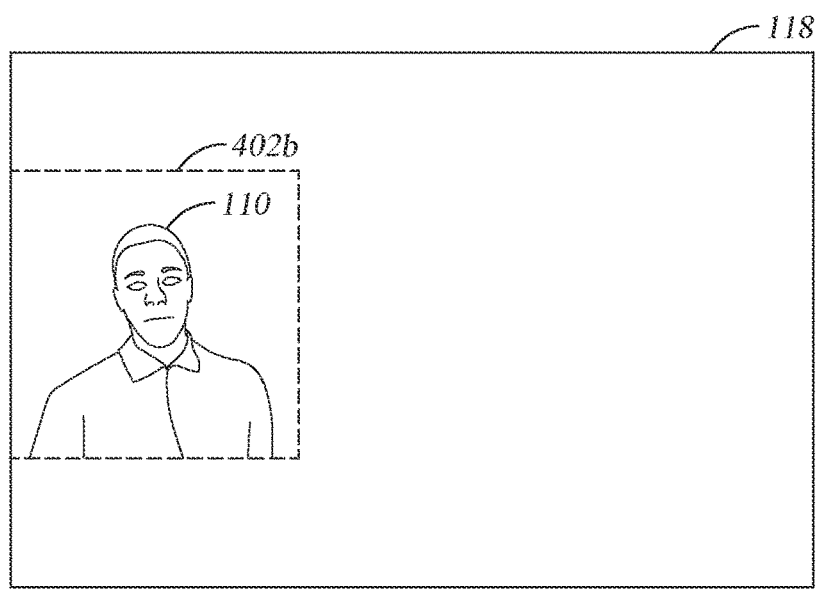
Figure 4C:
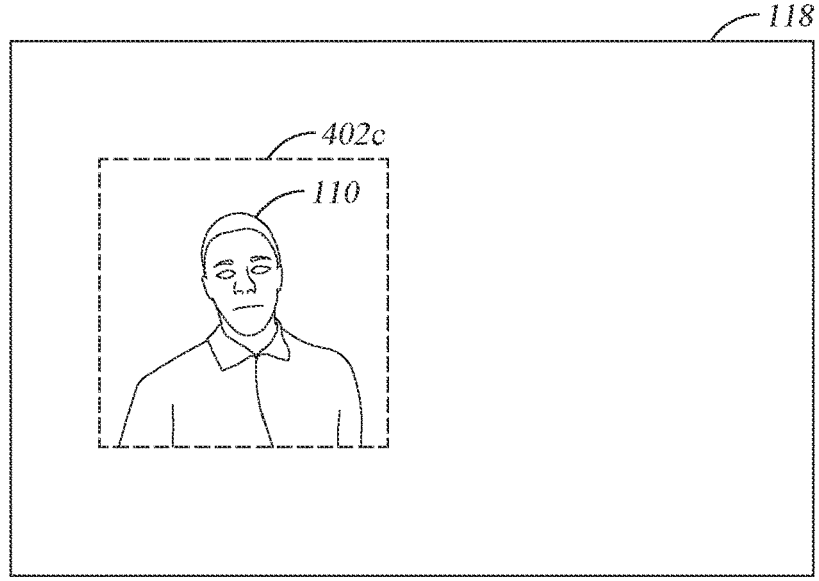

FIGS. 4A-4C are schematic representations of different examples that can be used to determine an individual cropping loss value corresponding to FOV restriction according to one or more embodiments. FOV restriction is based on whether an assigned cropping is close to the edge or exceeds the edge of the frame 118. For example, cropping 402a exceeds the edge of frame 118, cropping 402b touches the edge of frame 118, and cropping 402c is completely within frame 118. In this example, the closer a cropping is to the edge of the frame 118, the less desirable the cropping. Furthermore, it is impossible to crop outside of the frame 118, since in this example the frame 118 is defined by the FOV 111 of the camera device 106. Therefore, the individual cropping loss value corresponding to FOV restriction increases the closer the cropping is to the edge of the frame 118, then rapidly increases once the cropping exceeds the edge of the frame 118. For example, the individual cropping loss value corresponding to FOV restriction for cropping 402a is higher than the individual cropping loss value corresponding to FOV restriction for cropping 402b, which is higher than the individual cropping loss value corresponding to FOV restriction for cropping 402c. Because the individual cropping loss value corresponding to FOV restriction rapidly increases once a cropping exceeds the frame 118, differences between the individual cropping loss value corresponding to FOV restriction between cropping 402a and cropping 402b is greater than the difference between cropping 402b and cropping 402c. In one example, the individual cropping loss value for the cropping 402a may have a value of 95 versus the individual cropping loss value for the cropping 402b may have a value of 85 versus the individual cropping loss value for the cropping 402c may have a value of 20.

Figure 5A:
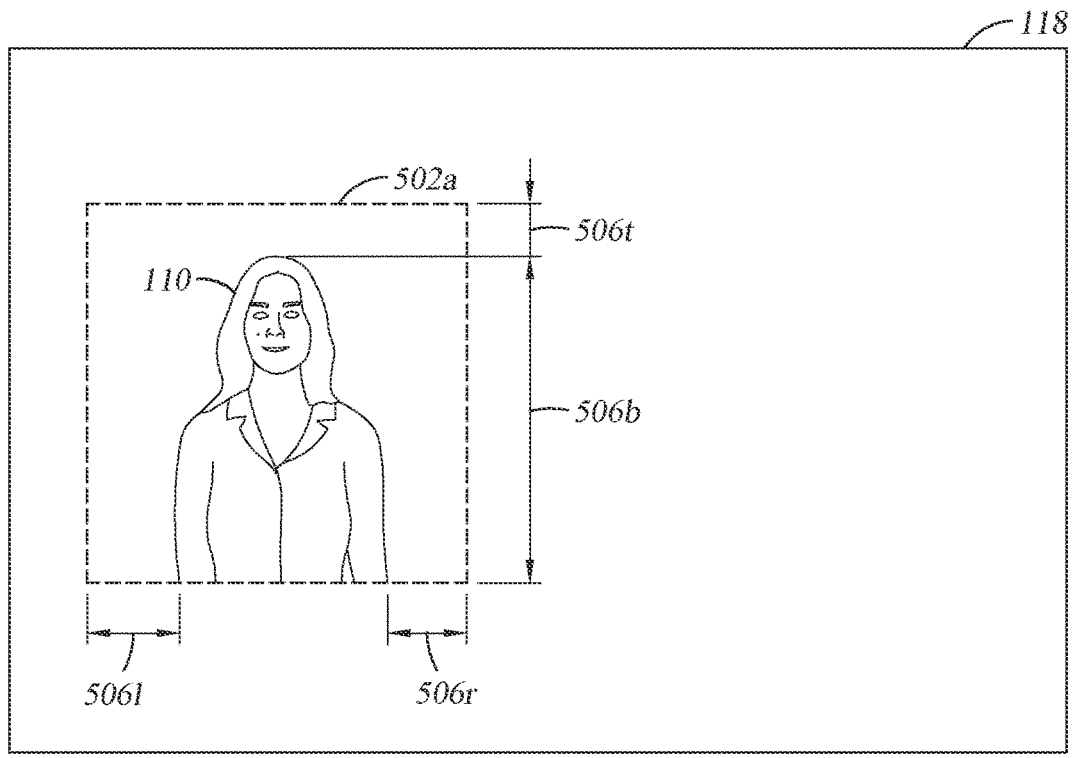
FIGS. 5A-5B are schematic representations of croppings that illustrate how individual cropping loss values can vary due to the free space in a cropping around object(s), according to one or more embodiments.
Figure 5B:
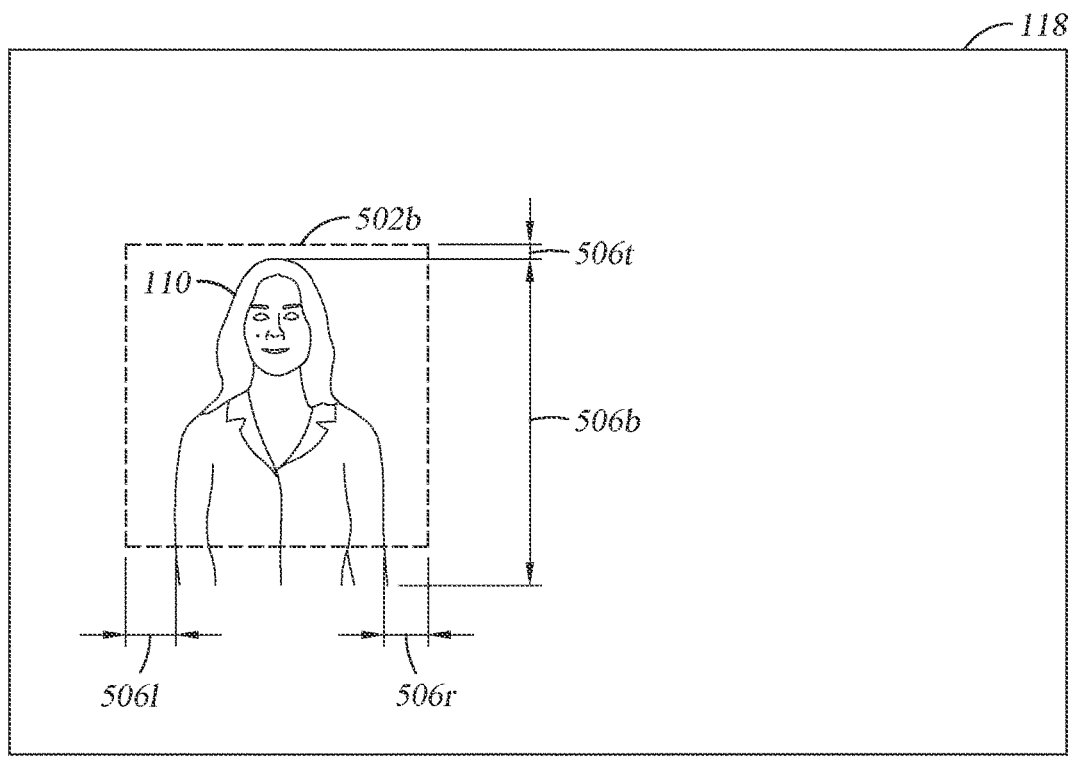

FIGS. 5A-5B are schematic representations of different examples that can be used to determine an individual cropping loss value corresponding to restriction of free space according to one or more embodiments. During the process of determining a preferred cropping within multiple croppings the system controller 102 will attempt to adjust the edge of the croppings so that they are as close to object(s) (participant(s)) as possible to minimize the effect of the determination of a preferred cropping configuration on other cropping attributes used to define an overall cropping loss value. In one example, it is more desirable to cut-off the bottom of a participant than the head or sides of a participant. Furthermore, it is more desirable to cut-off the sides of the participant than the head of the participant. Therefore, the individual cropping loss value corresponding to restriction of free space is greater for adjusting the edge of the croppings so that they are closer to the head of a participant than adjusting the edge of the croppings so that they are close to the sides of a participant, which is greater than adjusting the edge of the croppings relative to the bottom portion of a participant. The individual cropping loss value corresponding to restriction of free space is based on a distance between the top of a cropping and a participant's head, the distance between respective sides of a cropping and sides of a participant, and distance between the bottom of a cropping and the bottom of a participant. For example, as compared to cropping 502a, in cropping 502b the edges near the head, sides, and bottom of first participant 110 are adjusted so that they are closer to the respective portion of the participant.

For example, the head distance 506t, i.e., the distance between the head of first participant 110 and the top of a cropping, in cropping 502b is less than the head distance 506t in cropping 502a. Thus, there is a larger penalty assessed to the individual cropping loss value for cropping 502b due to the reduced head distance 506t. The left distance 506l, i.e., the distance between the left side of first participant 110 and the left side of a cropping, in cropping 502b is less than the left distance 506l in cropping 502a. Thus, there is a larger penalty assessed to the individual cropping loss value for cropping 502b due to the reduced left distance 506l. The right distance 506r, i.e., the distance between the right side of first participant 110 and the right side of a cropping, in cropping 502b is less than the right distance 506r in cropping 502a. Thus, there is a larger penalty assessed to the individual cropping loss value for cropping 502b due to the reduced right distance 506r. The bottom distance 506b, i.e., the distance between the bottom side of first participant 110 and the bottom of a cropping, in cropping 502b is less than the bottom distance 506b in cropping 502a. Thus, there is a larger penalty assessed to the individual cropping loss value for cropping 502b due to the reduced bottom distance 506b. Therefore, the top, bottom, and sides of cropping 502b are adjusted so that they are closer to the respective portion of the participant, resulting in cropping 502b having a higher individual cropping loss value corresponding to a restriction of free space. The adjustment of the top, bottom, and sides of the edge of the cropping each cause the cropping 502b to have a higher individual cropping loss value corresponding to restriction of free space than cropping 502a. However, the degree of penalization for adjusting the edge of the cropping closer to the head is greater than adjusting the edge of the cropping closer to the sides, which is greater than adjusting the edge of the cropping relative to the bottom of the cropping. In one example, the individual cropping loss value for the distance 506t of the cropping 502a may have a value of 10 versus the individual cropping loss value for the distance 506t of the cropping 502b which may have a value of 80, which means that the distance 506t of cropping 502a is preferred over the distance 506t configuration of cropping 502b. In another example, the individual cropping loss value for the distances 506b, 506l and 506r of the cropping 502a may each have a value of 10, 10, 10, respectively, versus the individual cropping loss value for the distances 506b, 506l and 506r of the cropping 502b may have a value of 50, 60, 55, respectively, which means that the distances 506b, 506l and 506r of cropping 502a are preferred over the distances 506b, 506l and 506r configuration of cropping 502b.

Furthermore, if an object is located on the edge of the frame 118, there is no penalty for adjusting the side of the cropping located on the edge. For example, if the first participant 110 is located on the left edge of the frame (e.g., cropping 402b in FIG. 4B), there would be no penalty assessed for adjusting the left side of the cropping to keep the cropping within the frame. There is no penalty assessed because a cropping cannot be physically located outside of the frame 118. Advantageously, the scoring of free space restrictions forces the croppings to be even more symmetric and will manipulate the system controller 102 to cut-off croppings to the lower half of participant(s) so that participant's heads are not cut-off so remote participants can see their face/facial expressions.

Figure 6A:
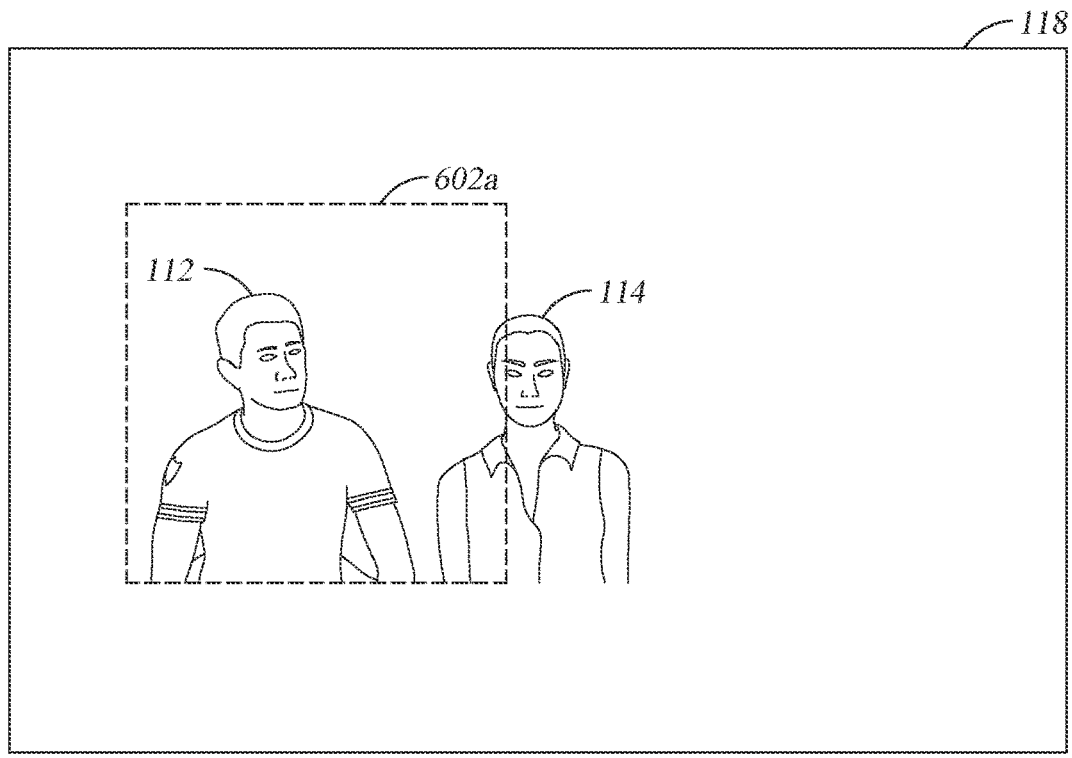
FIGS. 6A-6B are schematic representations of croppings that illustrate how individual cropping loss values can vary due to the full or partial presence of a hitchhiker in a cropping, according to one or more embodiments.
Figure 6B:
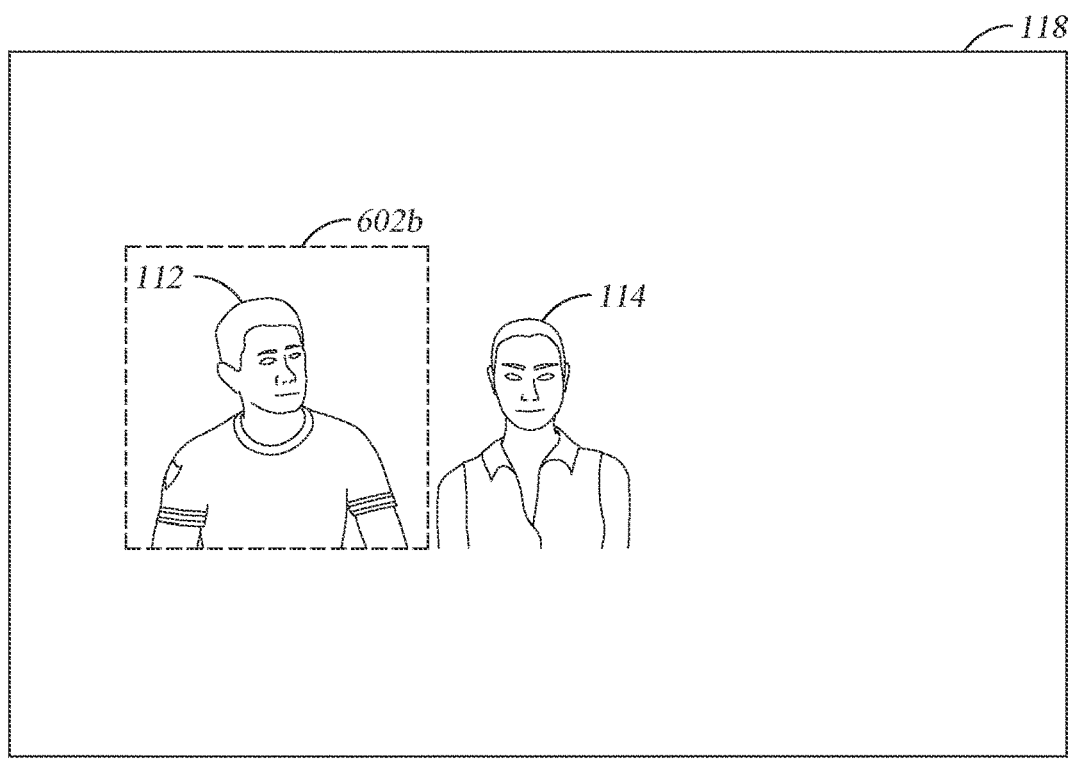

FIGS. 6A-6B are schematic representations of different examples that can be used to determine an individual cropping loss value corresponding to the presence of hitchhikers according to one or more embodiments. A hitchhiker may be defined herein as a portion of an object included in a cropping without having the entire width of the object in the cropping. Stated differently, a hitchhiker may be an unwanted portion of an object, such as a portion of a participant (e.g., shoulder of an additional participant), included in a cropping. A hitchhiker may also be defined as an unwanted or unintended object entirely included in a cropping. Therefore, croppings that include a hitchhiker are penalized. The more the hitchhiker is included in a cropping the higher the individual cropping loss value corresponding to the presence of hitchhikers. For example a cropping including 10% of a hitchhiker's body would have a lower individual cropping loss value corresponding to the presence of a hitchhiker than a cropping including 50% of a hitchhiker's body. For example, cropping 602a includes a portion of hitchhiker (e.g., the third participant 114) while cropping 602b does not include a hitchhiker, so cropping 602a has a higher individual cropping loss value corresponding to the presence of hitchhikers. In one example, the individual cropping loss value for the cropping 602a may have a value of 75 versus the individual cropping loss value for the cropping 602b may have a value of zero or 1. Although FIGS. 6A-6B described a cropping with a single hitchhiker, croppings may include a plurality of hitchhikers and be penalized accordingly.

Furthermore, an individual cropping loss value corresponding to whether the cropping is larger than the ideal cropping may be determined (not shown). Croppings that are larger than the ideal size may be penalized. The larger a cropping is than the ideal cropping size, the higher the penalty. In some examples, adjusting a cropping to minimize the other individual cropping loss values may cause the cropping to be greater than the ideal cropping size. The attributes of an ideal or preferred cropping size can be defined by attributes stored in memory. The attributes of a cropping that has an ideal or preferred size can be defined by attributes that include, but are not limited to, the area of the cropping (e.g., number of pixels within the edges of the cropping), shape, and aspect ratio of the cropping.

Although five individual cropping attributes are used to determine the cropping loss value for each cropping are discussed above, this is for example purposes only. Each set of individual cropping loss values may include any quantity of individual cropping loss values.

Each of the individual cropping loss values are then inputted into the cropping function to determine an overall cropping loss value for each cropping determined by the system controller 102. In various embodiments, the cropping function includes cropping weights, or cropping coefficients, that correspond to each cropping attribute. In one example, the cropping weights may range in value between 0 and 1. In some examples, a cropping weight may exceed 1. Each individual cropping loss value for each cropping attribute (e.g., FOV restriction, restriction of free space, etc.) is multiplied by its corresponding cropping weight to determine a weighted individual attribute loss value (WIALV), which are then added together to form a weighted individual cropping loss value (WICLV) for each of the croppings. Each of the WICLVs for each combination of croppings are added together generating a total grouping loss value for each combination of croppings.

FIG. 7 illustrates combinations of croppings including croppings 120a, 120b and 120d. Here, for the reasons described above, croppings 120a and 120b are a combination of croppings and cropping 120d is a combination of croppings. Although FIG. 7 includes croppings 120a, 120b and 120d, the process steps described herein during activity 208 are repeated for all of croppings, such as adjusting the configuration of each of the individual croppings, such as croppings 120a, 120b, 120c, 120d, 120e and 120f of FIG. 1A to determine the preferred configuration of each of the individual croppings 120a, 120b, 120c, 120d, 120e and 120f. The determination of the preferred configuration of each of the individual croppings is determined by use of the cropping function that is applied to each individual cropping to determine the preferred cropping attributes of each individual cropping that achieves the lowest overall individual cropping loss value. In various embodiments, after determining individual cropping loss values 702a, 702b, 702c and 702d for each individual cropping attribute, the individual cropping loss values 702a, 702b, 702c and 702d are multiplied by a corresponding cropping weight. An individual weighted individual cropping loss value (WICLV) is calculated based on the cropping loss function. In one example, the weighted individual cropping loss value (WICLV) 752 for the cropping 120a can determined by the equation $$WICLV = C1(702a) + C2(702b) + C3(702c) + C4(702d),$$

where C1, C2, C3 and C4 are the cropping weights, and 702a, 702b, 702c and 702d are the individual cropping loss values for each of the cropping attributes. Each cropping weight C1, C2, C3 and C4 correspond to a respective individual cropping loss value 702a, 702b, 702c and 702d. For example, different cropping weights C1, C2, C3 and C4 may be assigned to an asymmetry loss value 702a, FOV restriction loss value 702b, restriction of free space loss value 702c, and hitchhiker presence loss value 702d. In this example, the set of individual cropping attributes determined for croppings 120a, 120b and 120d include four cropping attributes, however, more or less cropping attributes may be used. This process is simultaneously done for all of the other combinations of croppings. The size and shape of each individual cropping is adjusted (i.e., changed) into every possible configuration.

Advantageously each individual cropping is adjusted based on the cropping weights of the cropping formula. This provides guidance for the system controller 102 on how to adjust each of the individual croppings based on user implemented trade-offs between each attribute. For example, if the cropping weight for asymmetry is 0.7 and the cropping weight for the restriction of free space is 0.2, the system controller 102 may prioritize symmetry over the restriction of free space to minimize the WICLVs. Activities 202 through 208 are repeated throughout the video conference.

At activity 209, the software running on the system controller 102 then determines the preferred combination of croppings that include all of the objects within the FOV 111. The preferred combination of croppings will include the one or more croppings formed during activity 208, which when combined together achieves a minimum total combined cropping loss value, such as total combined cropping loss values 761-764, illustrated in FIG. 7. During activity 209 the software running on the system controller 102 will compare each of the weighted individual cropping loss values (WICLVs) (e.g., items 751-753 in FIG. 7) for each of the croppings to determine the group of croppings that includes all of the objects and achieves the lowest total combined cropping loss value. Referring to FIG. 1A, by way of example, if it is determined at a first time that cropping 120a has a WICLV of 55, cropping 120b has a WICLV of 57, cropping 120c has a WICLV of 25, cropping 120d has a WICLV of 50, cropping 120e has a WICLV of 60, and cropping 120f has a WICLV of 80, a preferred combination of croppings that includes all of the objects would be the croppings 120c and 120d. In this example, cropping 120c is favored over croppings 120a, 120b, 102e and 120f, since cropping 120c has a WICLV of 25 which is less than the WICLV of 120a, 120b, 102e, and 120f, which are 55, 57, 60, and 80, respectively. Similarly, cropping 120d is favored over croppings 120e and 120f, since cropping 102d has a WICLV of 50 which is less than the WICLV of 120e and 120f, which are 60 and 80, respectively. Additionally, cropping 120d is favored over the grouping that includes separate croppings 120a and 120b, since cropping 120d has a WICLV of 50 which is less than the combination of WICLV of the separate croppings 120a and 120b, which is 107. However, if it is determined at a second time that the cropping 120a has a WICLV of 25, cropping 120b has a WICLV of 20, cropping 120c has a WICLV of 30, cropping 120d has a WICLV of 50, cropping 120e has a WICLV of 60, and cropping 120f has a WICLV of 80, a preferred combination of croppings that includes all of the objects would be the croppings 120a, 120b and 120c, since each of the three croppings has a WICLV that is below the WICLV of the other croppings 120d, 120e and 120f, the combination of WICLV for the two separate croppings 120a and 120b is less than the WICLV of cropping 120d, the combination of WICLV for the two separate croppings 120b and 120c is less than the WICLV of cropping 120e, and the of WICLV for the three separate croppings 120a, 120b and 120c is less than the WICLV of the cropping 120f. However, if it is determined at a third time that cropping 120f has a WICLV of 10, while the WICLV of the other croppings remain the same, the preferred combination of croppings that includes all of the objects would be cropping 120f by itself. The total combined cropping loss value of the determined preferred combination of croppings is the preferred cropping loss value.

At activity 210, the system controller 102 determines whether a difference between the preferred cropping loss value and also the total combined cropping loss value of the currently used cropping combination (the current cropping loss value) is less than a cropping threshold. Adjusting the attributes of the croppings and/or combination of croppings interferes with the viewing experience of a remote user. Therefore, in some instances it is not worth interrupting the viewing experience for only insignificant improvements. However, for example, if a new participant enters the conference environment 108 the number of objects, the grouping of the objects and/or the frame 118 may need to be adjusted. For example, the cropping threshold may be a value configured to ensure the preferred cropping loss value is at least 50% less (i.e. better) than the current cropping loss value, or at least 40% less (i.e. better) than the current cropping loss value, or at least 30% less (i.e. better) than the current cropping loss value, or at least 20% less (i.e. better) than the current cropping loss value, or at least 10% less (i.e. better) than the current cropping loss value.

If the difference between the preferred cropping loss value and the current cropping loss value is greater than the cropping threshold value, it is not worth interrupting the remote user's viewing experience and the method returns to activity 208. If the difference between a preferred cropping loss value and the current cropping loss value is less than the cropping threshold, the method 200 will proceed to activity 210 and the system controller 102 determines whether the preferred cropping is stable.

At activity 210, the system controller 102 determines whether the duration of time elapsed since the difference between the preferred cropping loss value and the current cropping loss value exceeded a cropping time threshold. For example, as a new participant enters the meeting, the total combined cropping loss value for each combination of croppings will continuously change until the new participant settles into the meeting and takes a seat, causing the preferred cropping to continuously change until the new participant settles in. The system controller 102 is configured not to continuously update the current cropping until the new participant settles in, preventing multiple interruptions to a remote user's viewing experience. Therefore, if the duration of time elapsed does not exceed the cropping time threshold, the method returns to activity 210. If the duration of time elapsed does exceed the cropping time threshold, the method proceeds to activity 214 and the current cropping combination is changed to the preferred cropping.

The WICLVs are constantly changing as frames are continuously surveyed and the croppings are continuously adjusted during a video conference. The greater the improvement of the preferred cropping as the WICLVs are changing, the quicker the cropping should be changed to maximize the viewing experience of a remote user. In various embodiments, to account for this as the difference between the preferred cropping loss value and the cropping threshold increases, the cropping time threshold decreases.

Stated differently, the greater the improvement provided by a preferred cropping, the faster it is selected.

After determining all of the possible groupings in activity 209, when the determined number of groupings exceeds the maximum quantity of groupings rule the system controller determines a preferred grouping based on a grouping formula. Schematic representations of a method for determining the preferred grouping are illustrated in FIGS. 8-14.

FIG. 8 is a schematic representation of an example of a process of determining a total combined grouping loss value according to one or more embodiments. A combination of groupings as defined herein, is a combination of croppings having a quantity of croppings that is based on a maximum quantity of groupings rule. In various embodiments, each combination of groupings is limited to the maximum quantity of groupings. In one example, the maximum quantity of groupings may be indicated by a user or determined by hardware limitations of the video conferencing system 105 or supporting network.

Each combination of groupings includes at least one cropping, and each object or groups of objects are included in at least one cropping that make-up a combination of groupings. For example, referring to FIG. 1A, if the maximum quantity of groupings is two, the combinations of groupings may include, but are not limited to, 120$a$ and 120$e$, 120$c$ and 120$e$, 120$f$, or more generally any combination of groupings that include each object of interest within two or less croppings. Then, based on grouping attributes, and a grouping function including grouping weights, a preferred combination of groupings may be selected in a similar manner in which the preferred combination of croppings is selected. This will be described in more detail below.

Figure 9:
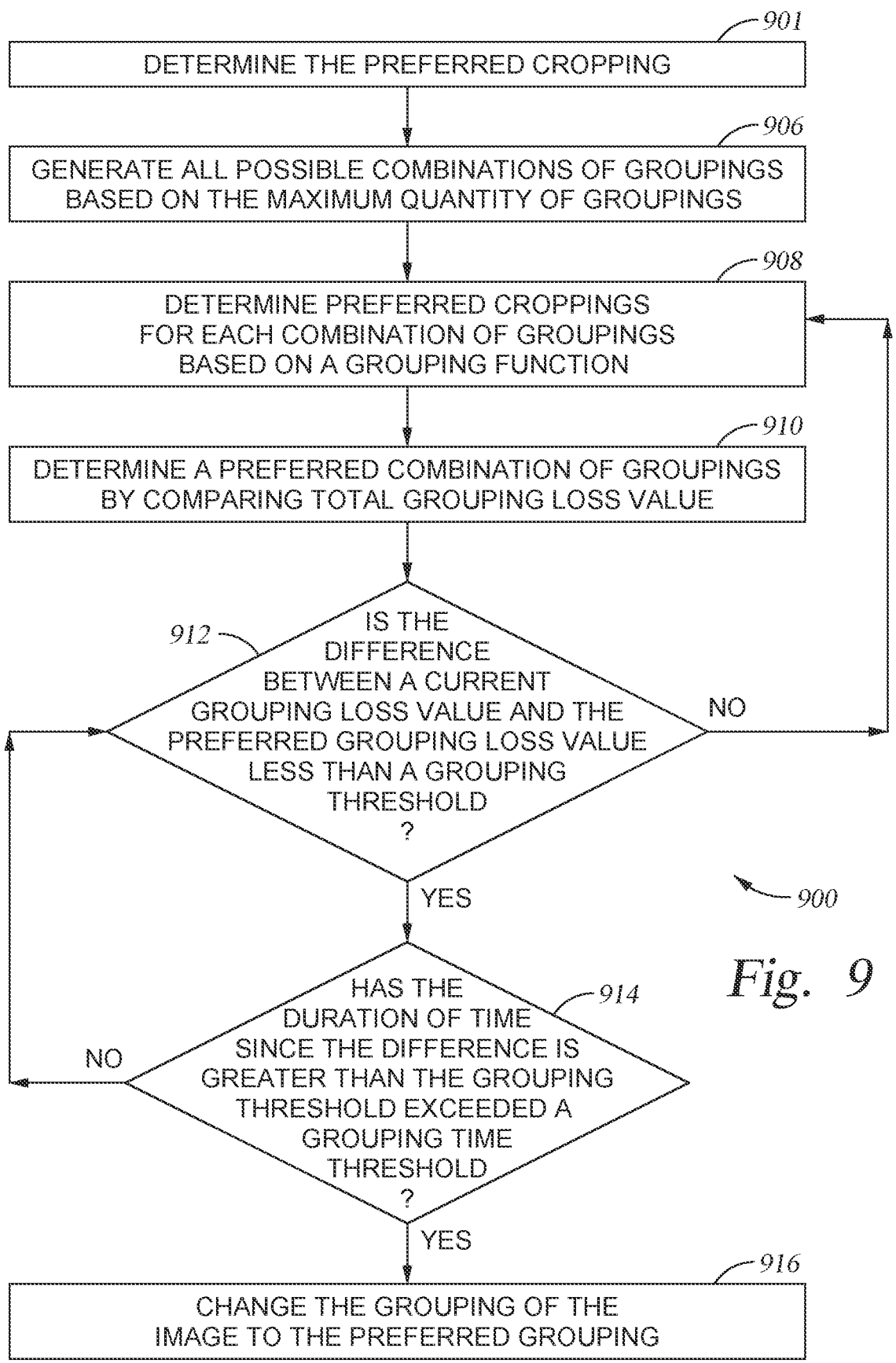
FIG. 9 is a diagram illustrating a method according to one or more embodiments, for adjusting a to-be-transmitted view (display view) of a video stream of a conference environment based on a state of the conference environment 108.

FIG. 9 is a diagram illustrating a method 900 according to one or more embodiments, for adjusting a to-be-transmitted view (display view) of a video stream of a conference environment 108 based on a state of the conference environment 108, for example, the number and locations of objects detected therein. The method 900 may be performed using the video conferencing system 105 described above or any other suitable video conferencing system where automatic grouping and framing of more than one region of interest is desired. Aspects of the method 900 are schematically illustrated in FIGS. 8 and 10-14.

In general, the method 900 is performed using one or more instructions which are executed by use of the processor 140 and resides in the memory 142 of the system controller 102.

At activity 901, the activities performed in method 200 are performed and the preferred combination of croppings are determined in the manner described in relation to FIG. 2 above.

At activity 906, the system controller 102 determines all of the possible combinations of groupings based on a maximum quantity of groupings rule. Stated differently the system controller 102 determines every combination of groupings including a quantity of croppings less than or equal to the maximum quantity of groupings. For example if the maximum quantity of groupings is two, each combination of groupings includes two or less croppings.

Each object or groups of objects are included in at least one cropping of each combination of groupings. Each of the croppings includes at least one object. Stated differently, each participant is included in at least one cropping in each combination of groupings.

At activity 908, the system controller 102 determines preferred croppings for each combination of groupings based on a grouping function. The attributes of each of the croppings is adjusted until a preferred set of attributes for each cropping is determined. Each combination of groupings is adjusted based on a grouping loss function that includes a plurality of grouping attributes. As will be described in more detail below, the preferred configuration of a grouping is the combination of grouping attributes that minimize the value of the grouping function.

The grouping function is used to generate a total combined grouping loss value for each combination of groupings. The total combined grouping loss value is determined by determining a set of individual grouping loss values for each combination of groupings. A set of individual grouping loss values are determined for each cropping in each combination of groupings. For example, a set of individual grouping loss values may be determined for croppings 120$a$-120$f$, which are illustrated in FIG. 1A. Each set of individual grouping loss values include individual grouping loss values that correspond to a grouping attribute. Examples of grouping attributes include, but are not limited to, vertical distance, space restriction, people distance, vertical shift, and whether a cropping is missing, and each of the attributes described with respect to cropping. The discussions related to examples of possible grouping attributes, such as the cropping attributes relating to FIGS. 10A-10B, 11A-11B and 12A-12B, and 13A-13B are provided below.

In some embodiments, and for ease of discussion, each individual grouping loss value for each of the grouping attributes is determined in the negative. Stated differently, the higher the grouping loss value the less desirable a defined attribute of a grouping is versus a lower grouping loss value. Moreover, the higher an individual grouping loss value, the worse the grouping is with respect to the corresponding grouping attribute. For example, the greater the horizontal distance between participants are in a cropping, the higher the individual grouping loss value. In one example, each individual grouping loss value for each grouping attribute may range from a value between 0 and 100 with 0 indicating zero penalty and 100 indicating a maximum penalty. In some embodiments, the range of values of the grouping loss value between the minimum and maximum values is defined by a linear scale. Examples of how each of these grouping attributes are determined are illustrated in FIGS. 10-14. While the discussion provided herein primarily utilizes a negative scale for the grouping loss value comparisons, one skilled in the art would understand that a positive scale (e.g., higher grouping loss value is more desirable) could alternately be used to achieve the same determination of a preferred grouping within a group of groupings.

Figure 10A:
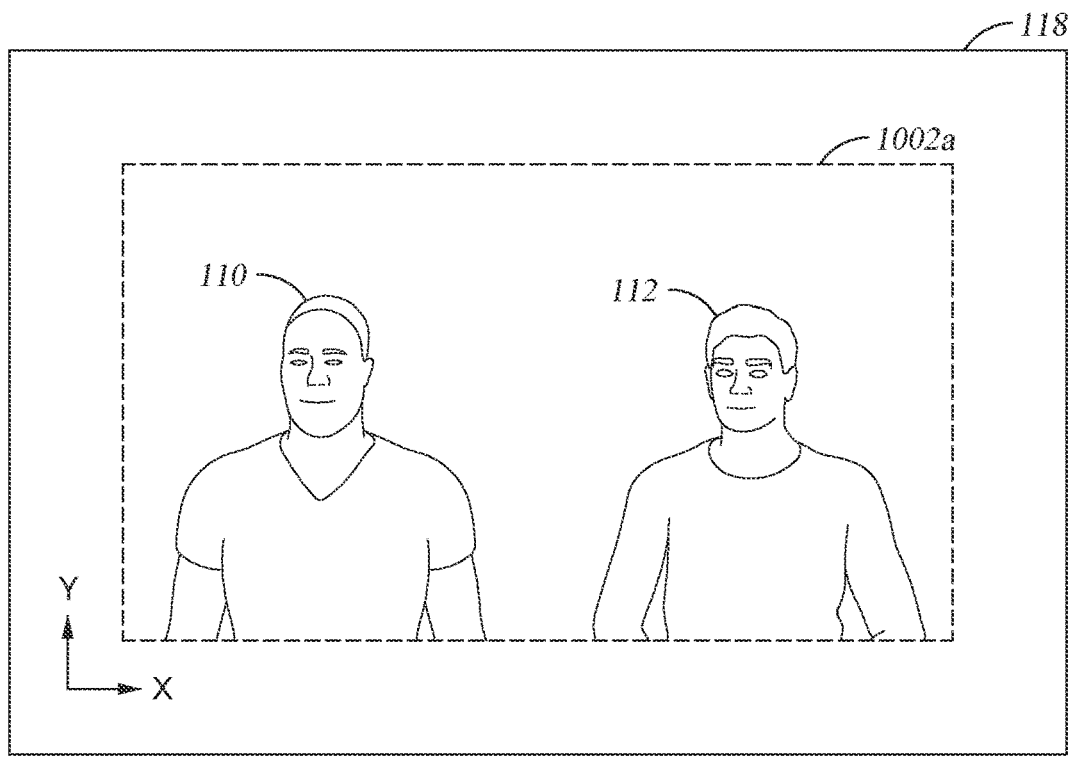
FIGS. 10A-10B are schematic representations of croppings that illustrate how individual grouping loss value can vary due to the distance between objects within the cropping, according to one or more embodiments.
Figure 10B:
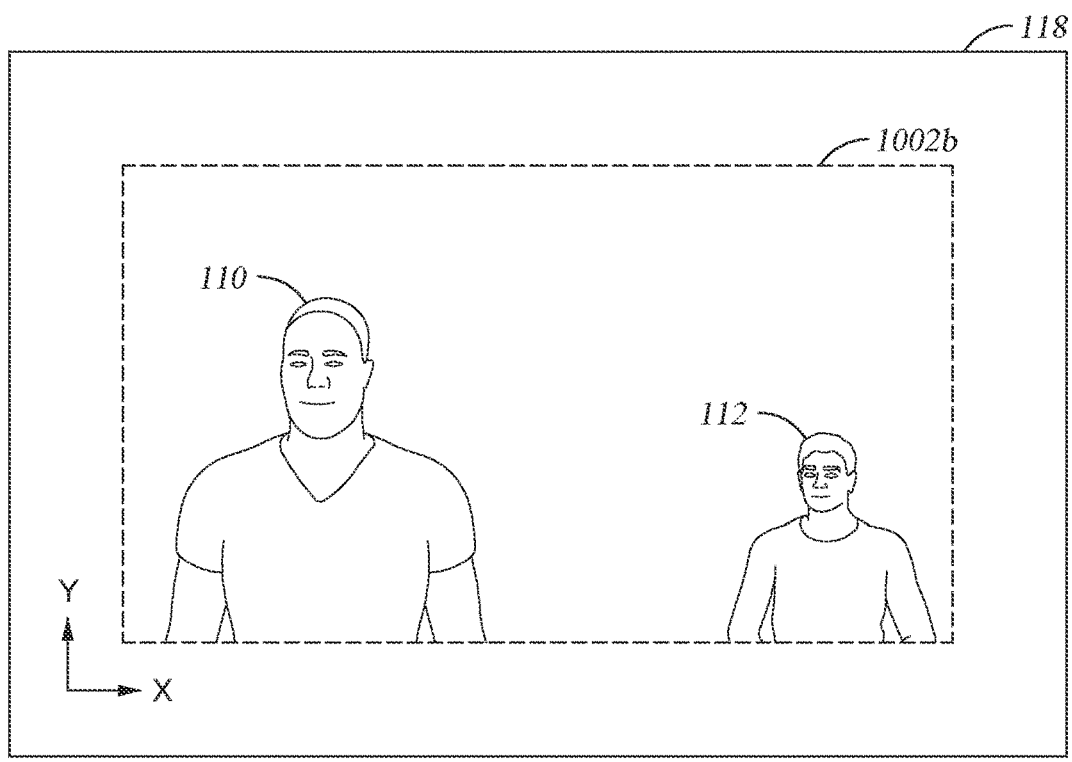

FIGS. 10A-10B are schematic representations of examples of a process of determining an individual grouping loss value corresponding to the distance between objects according to one or more embodiments. In various embodiments, it is preferable to form a cropping with a lower distance between objects. A distance between objects may be defined as the difference between a target location of each object and a top or bottom border of the cropping. The target location may include, but is not limited to, a center of mass of an object, the top of an object, the bottom of an object, or the like. For example, as shown in cropping 1002$a$ (FIG. 10A) and cropping 1002$b$ (FIG. 10B) a distance 1004$a$ may be defined as the distance between the center of mass of the first participant 110 and the bottom of both croppings, and a distance 1004$b$ may be defined as the distance between the center of mass of the second participant 112 and the bottom of both croppings. The greater the magnitude of the difference between distance 1004a and distance 1004b, the higher the individual grouping loss value corresponding to distance between objects. For example in cropping 1002a, the difference between distances 1004a and 1004b is less than the difference between distances 1004a and 1004b in cropping 1002b. Therefore, the individual grouping loss value corresponding to the distance between objects for cropping 1002a is lower than the individual grouping loss value corresponding to the distance between objects for cropping 1002b. In one example, the individual grouping loss value for the cropping 1002a may have a value of 10 versus the individual cropping loss value for the cropping 1002b may have a value of 70.

Figure 11A:
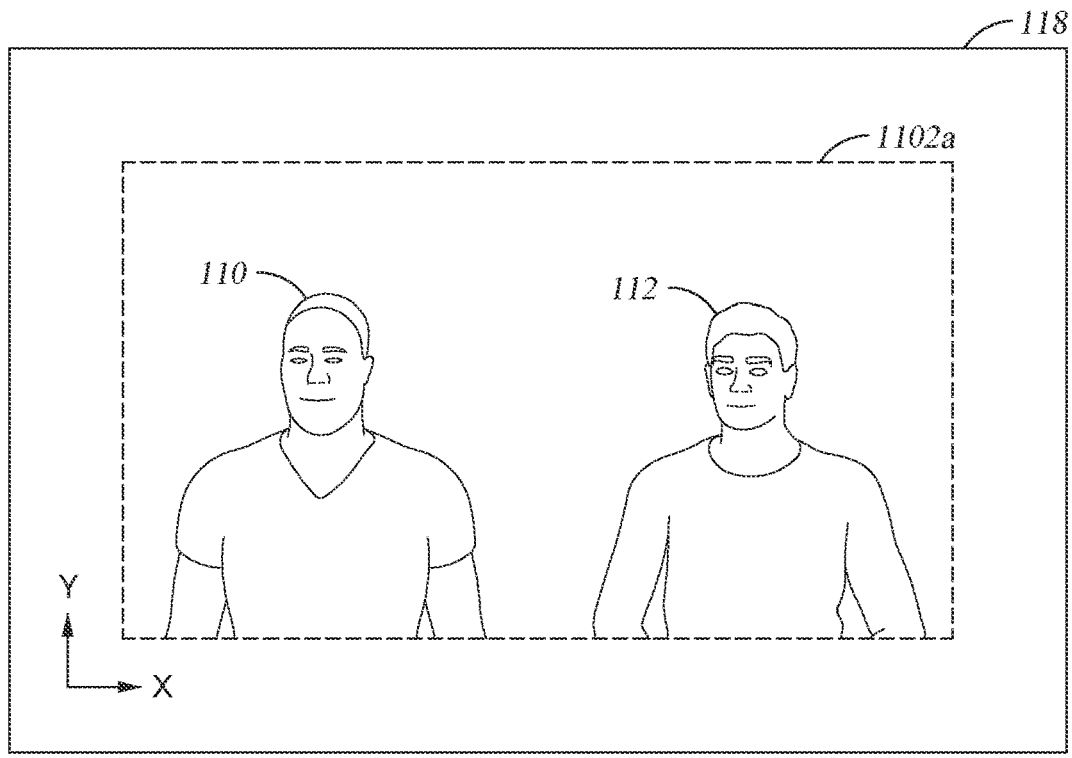
FIGS. 11A-11B are schematic representations of croppings that illustrate how individual grouping loss value can vary due to space restriction within the cropping, according to one or more embodiments.
Figure 11B:
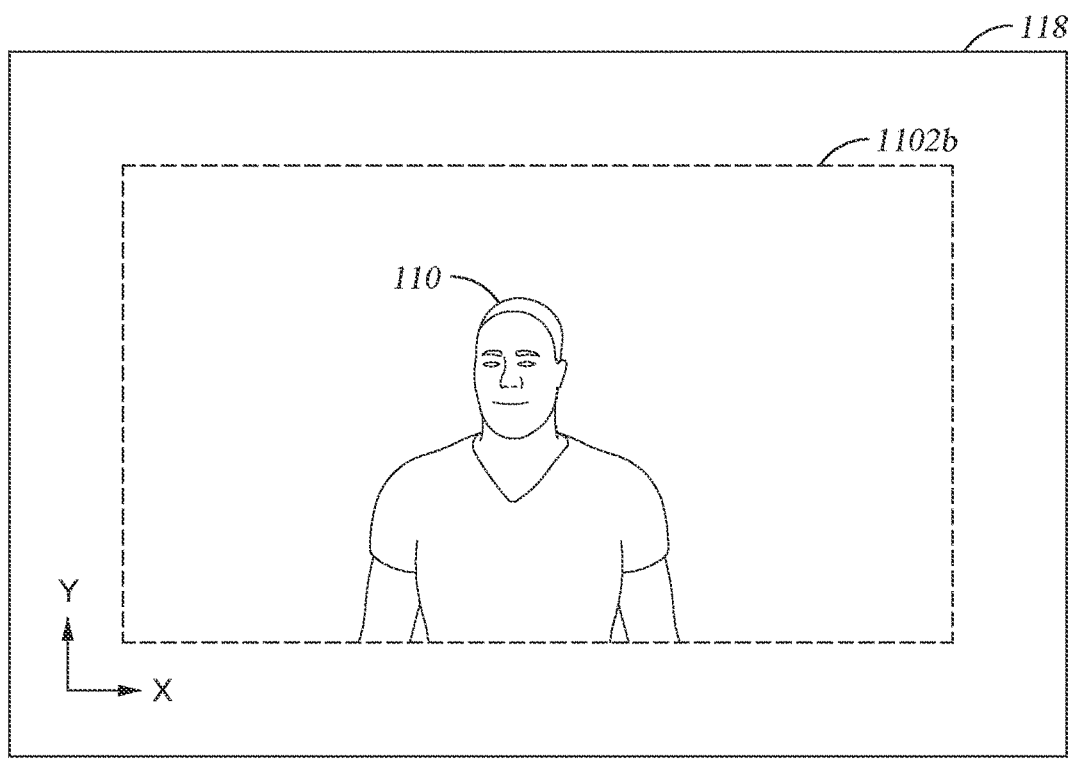

FIGS. 11A-11B are schematic representations of examples of a process of determining an individual grouping loss value corresponding to space restriction according to one or more embodiments. In various embodiments, it is generally preferable to form a cropping with less free space around the objects in the cropping. Therefore, in one example, the more free space in a cropping, the higher the individual grouping loss value corresponding to space restriction. For example, in FIGS. 11A-11B croppings 1102a and 1102b are positioned within croppings that are the same size. However, cropping 1102a includes the first participant 110 and the second participant 112 while cropping 1102b includes only the first participant 110. Therefore, there is more free space in cropping 1102b because two participants take up more space in the cropping than a single participant. Therefore, the individual grouping loss value corresponding to space restriction for cropping 1102a is lower than that of cropping 1102b because cropping 1102b includes more free space. In one example, the individual grouping loss value for the cropping 1102a may have a value of 12 versus the individual cropping loss value for the cropping 1002b may have a value of 65.

Figure 12A:
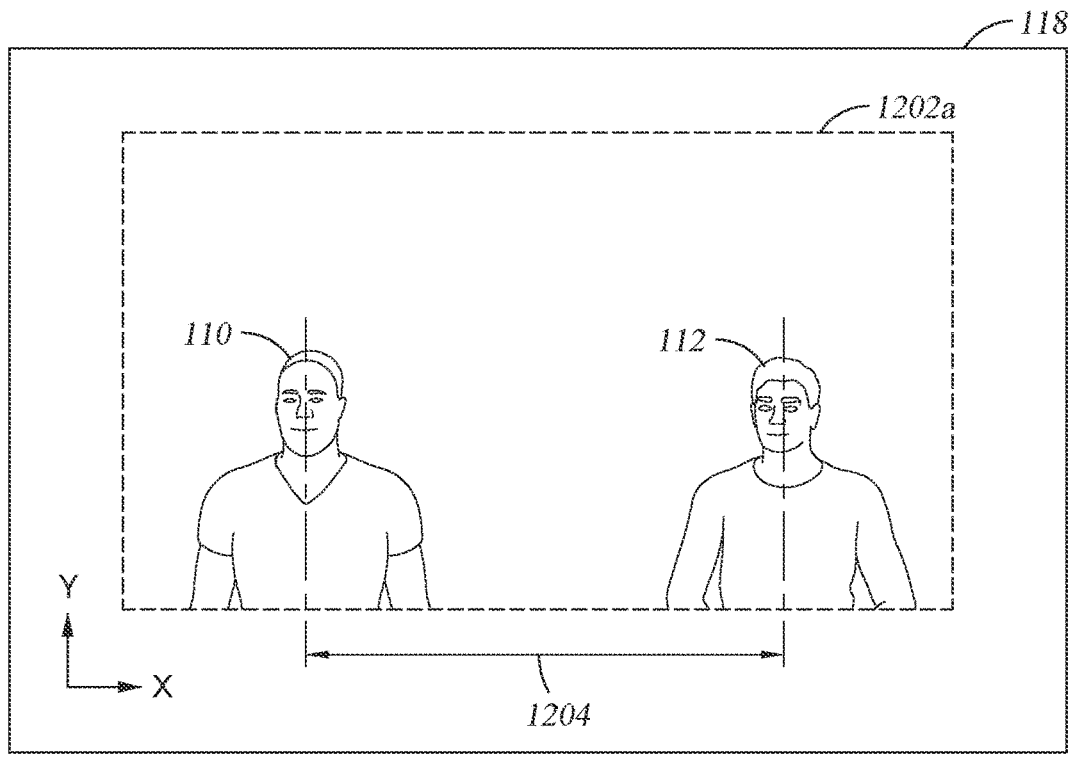
FIGS. 12A-12B are schematic representations of croppings that illustrate how individual grouping loss value can vary due to a horizontal distance between objects in the cropping, according to one or more embodiments.
Figure 12B:
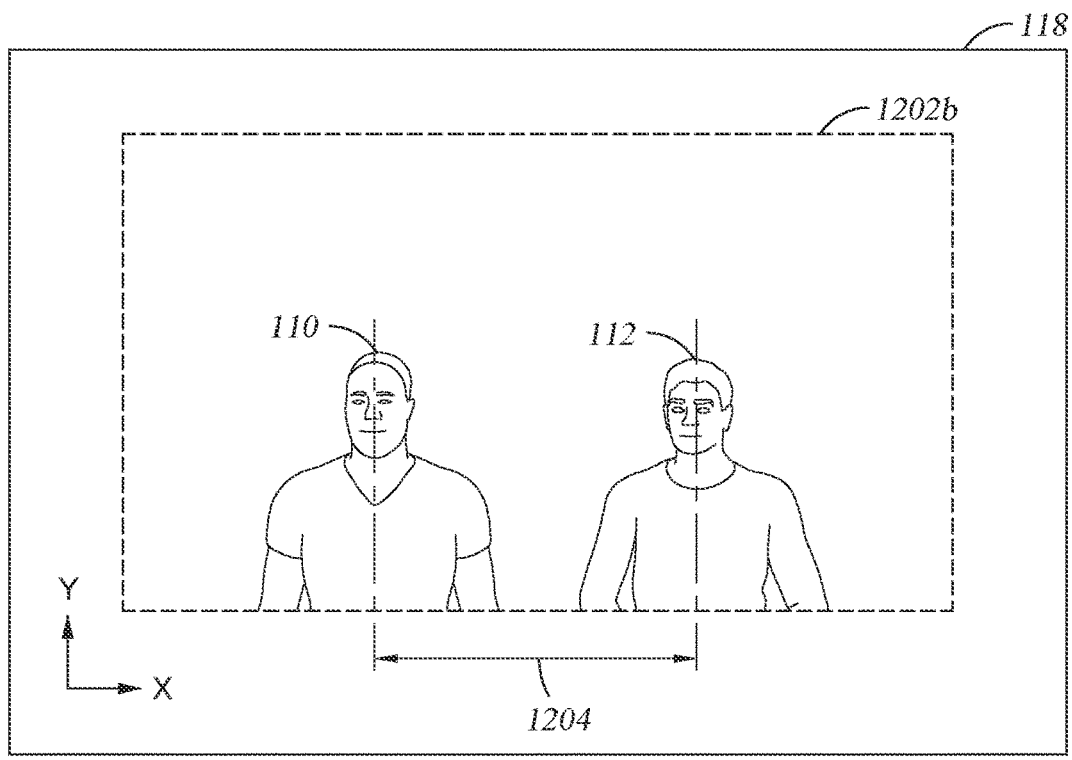

FIGS. 12A-12B are schematic representations of examples of a process of determining an individual grouping loss value corresponding to a horizontal distance between objects according to one or more embodiments. In various embodiments, it is preferable to form a cropping with lower horizontal distance between objects. A horizontal distance between objects may be defined as the horizontal distance 1204 along the x-axis between target locations of objects. For example, the horizontal distance between objects may be the horizontal distance 1204 between the center of mass of the first participant 110 and the second participant 112. In another example, the horizontal distance between objects may be defined as the horizontal distance between the sides of the participants, e.g., the horizontal distance between the left side of the first participant 110 and the right side of the second participant 112. The greater the distance between objects, the higher the individual grouping loss value corresponding to distance between objects. For example, cropping 1202a includes a greater horizontal distance 1204 (i.e., the distance between the first participant 110 and the second participant 112) than cropping 1202b. Therefore, the individual grouping loss value corresponding to the horizontal distance between objects for cropping 1202a is higher than that of cropping 1102b because cropping 1202a has a greater horizontal distance 1204. In one example, the individual grouping loss value for the cropping 1202a may have a value of 68 versus the individual cropping loss value for the cropping 1202b may have a value of 12.

Figure 13A:
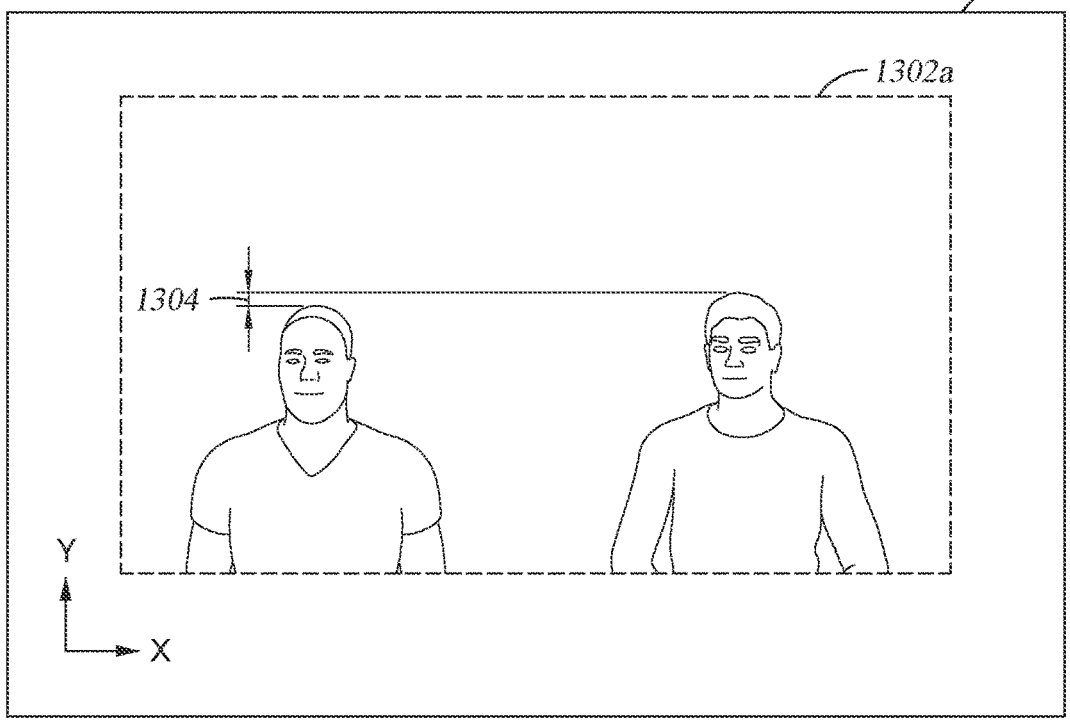
FIGS. 13A-13B are schematic representations of croppings that illustrate how individual grouping loss value can vary due to a vertical shift between objects within the cropping, according to one or more embodiments.
Figure 13B:
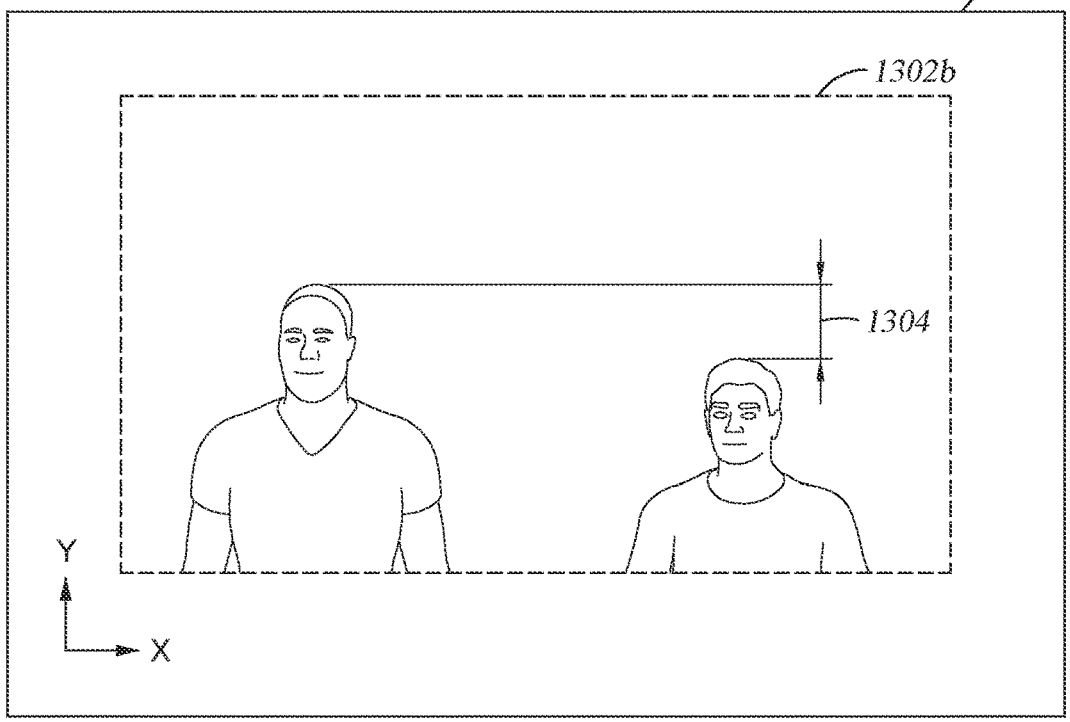

FIGS. 13A-13B are schematic representations of examples of a process of determining an individual grouping loss value corresponding to a vertical shift between objects according to one or more embodiments. In various embodiments, it is preferable to form croppings with a lower vertical shift between objects. A vertical shift between objects may be defined as the vertical distance along the y-axis between target locations of objects. For example, the vertical distance between objects may be the vertical distance 1304 between the heads of the first participant 110 and the second participant 112. In another example, the vertical shift between objects may be defined as the vertical distance between the center of mass of the first participant 110 and the second participant 112. The greater the vertical shift, the higher the individual grouping loss value corresponding to the vertical shift. For example, cropping 1302a includes a lower vertical distance 1304 than cropping 1302b. Therefore the individual grouping loss value corresponding to the vertical shift for cropping 1302a is lower than that of cropping 1302b. In one example, the individual grouping loss value for the cropping 1302a may have a value of 10 versus the individual cropping loss value for the cropping 1302b may have a value of 70.

Each of the individual grouping loss values are then inputted into the grouping function to determine an overall grouping loss value for each cropping in each combination of groupings determined by the system controller 102. In various embodiments, the grouping function includes grouping weights, or grouping coefficients, that correspond to each grouping attribute. In one example, the grouping weights may range in value between 0 and 1. In some examples, a grouping weight may exceed 1. Each individual grouping loss value for each grouping attribute (e.g., distance between objects, space restriction, vertical shift between objects, etc.) is multiplied by its corresponding grouping weight to determine an individual weighted grouping attribute loss values (IWGALVs), which are then added together to form individual weighted grouping loss values (IWGLVs) for each of the croppings. Each of the IWGLVs for each combination of groupings are added together generating a total grouping loss value for each combination of groupings.

FIG. 8 illustrates combinations of croppings including croppings 120a, 120b and 120d. Here, for the reasons described above, croppings 120a and 120b are a combination of groupings and cropping 120d is a combination of groupings. Although FIG. 8 includes croppings 120a, 120b and 120d, the process steps described herein during activity 908 are repeated for all of groupings, such as adjusting the configuration of each of the individual croppings, such as croppings 120a, 120b, 120c, 120d, 120e and 120f of FIG. 1A to determine the preferred configuration of each of the individual croppings 120a, 120b, 120c, 120d, 120e and 120f. The determination of the preferred configuration of each of the individual croppings is determined by use of the grouping function that is applied to each individual cropping to determine the preferred grouping attributes of each individual cropping that achieves the lowest overall individual grouping loss value. In various embodiments, after determining individual grouping loss values 802a, 802b, 802c and 802d for each individual grouping attribute, the individual grouping loss values 802a, 802b, 802c and 802d are multiplied by a corresponding grouping weight. Each grouping weight may correspond to a grouping attribute. For example, different grouping weights may be assigned to distances between objects, vertical shift, horizontal distance between objects, and the like. For example, the set of grouping attributes determined for croppings 120a, 120b, and 120c may include four grouping attributes. Individual weighted grouping loss values (IWGLV) is calculated based on the grouping function. In one example, the IWGLV 852 for the cropping 120*a* can determined by the equation $$IWGLV = G1(802a) + G2(802b) + G3(802c) + G4(802d),$$

where G1, G2, G3 and G4 are the grouping weights, and 802*a*, 802*b*, 802*c* and 802*d* are the individual grouping loss values for each of the grouping attributes. Each grouping weight G1, G2, G3 and G4 correspond to a respective individual grouping loss value 802*a*, 802*b*, 802*c* and 802*d*. For example, different grouping weights G1, G2, G3 and G4 may be assigned to a distances between objects grouping attribute 802*a*, a space restriction grouping attribute 802*b*, a vertical shift grouping attribute 802*c*, and a horizontal distance between objects grouping attribute 802*d*, respectively.

Although the quantity of grouping attributes determined is four, this is for example purposes only, any quantity of grouping attributes could be used. The quantity of grouping attributes can be greater than or less than four. The same four grouping attributes may be evaluated for each of the possible groupings determined by the software running on the system controller 102. This process is simultaneously done for all of the other combinations of groupings. The size and shape of each individual cropping is adjusted (i.e., changed) into every possible configuration based on the maximum grouping rule.

Advantageously, each individual grouping is adjusted based on the grouping weights of the grouping formula provided by a user. Advantageously, this provides guidance for the system controller 102 on how to adjust each of the individual groupings. For example if the grouping weight (G1) for a vertical shift is assigned a weight of 0.7 and the grouping weight (G2) for horizontal distance between groupings loss is assigned a weight of 0.2, the system controller 102 will tend to prioritize vertical shift over the horizontal distance between groupings since the weighting tends to minimize the total combined grouping loss values.

At activity 910, the software running on the system controller 102 then determines the preferred combination of groupings that include all of the objects within the FOV 111. The preferred combination of groupings will include the one or more croppings formed during activity 908, which when combined together achieves a minimum total combined grouping loss value, such as total combined grouping loss values 861-864, illustrated in FIG. 8. During activity 909 the software running on the system controller 102 will compare each of the IWGLVs (e.g., items 851-853 in FIG. 8) for each of the croppings to determine the group of croppings that includes all of the objects and achieves the lowest total combined grouping loss value. Referring to FIG. 1A, by way of example, if it is determined at a first time that cropping 120*a* has a IWGLV of 55, cropping 120*b* has a IWGLV of 57, cropping 120*c* has a IWGLV of 25, cropping 120*d* has a IWGLV of 50, cropping 120*e* has a IWGLV of 60, and cropping 120*f* has a IWGLV of 80, a preferred combination of groupings that includes all of the objects while remaining less than or equal the maximum quantity of groupings would be the croppings 120*c* and 120*d*. In this example, cropping 120*c* is favored over croppings 120*a*, 120*b*, 120*e* and 120*f*, since cropping 120*c* has an IWGLV of 25 which is less than the IWGLV of 120*a*, 120*b*, 120*e*, and 120*f*, which are 55, 57, 60, and 80, respectively. Similarly, cropping 120*d* is favored over croppings 120*e* and 120*f*, since cropping 120*d* has an IWGLV of 50 which is less than the IWGLV of 120*e* and 120*f*, which are 60 and 80, respectively. However, if it is determined at a second time that the cropping 120*a* has an IWGLV of 25, cropping 120*b* has an IWGLV of 20, cropping 120*c* has an IWGLV of 30, cropping 120*d* has an IWGLV of 50, cropping 120*e* has an IWGLV of 60, and cropping 120*f* has an IWGLV of 70, a preferred combination of groupings that includes all of the objects would be cropping 120*f*, since its IWGLV is the lowest IWGLV for each combination of groupings including a quantity of croppings less than the maximum amount of groupings. For example, a combination of groupings including croppings 120*a* and 120*d* would have an IWGLV equal to 85 and a combination of groupings including croppings 120*c* and 120*d* would have an IWGLV equal to 80, which are both greater than 70. The total combined grouping loss value of the determined preferred combination of groupings is the preferred grouping loss value. Activities 901 through 910 (and optionally 909) are repeated throughout the video conference.

At activity 912, the system controller 102 determines whether a difference between the preferred grouping loss value and also the total combined grouping loss value of the currently used grouping combination (the current grouping loss value) is less than a grouping threshold. Adjusting the attributes of the croppings and/or combination of groupings interferes with the viewing experience of a remote user. Therefore, in some instances it is not worth interrupting the viewing experience for only insignificant improvements. However, for example, if a new participant enters the conference environment 108 the number of objects, the grouping of the objects and/or the frame 118 may need to be adjusted. For example, the grouping threshold may be a value configured to ensure the preferred grouping loss value is at least 50% less (i.e. better) than the current cropping loss value, or at least 40% less (i.e. better) than the current cropping loss value, or at least 30% less (i.e. better) than the current cropping loss value, or at least 20% less (i.e. better) than the current cropping loss value, or at least 10% less (i.e. better) than the current cropping loss value.

If the difference between the preferred grouping loss value and the current grouping loss value is greater than the grouping threshold value, it is not worth interrupting the remote user's viewing experience and the method returns to activity 908. If the difference between a preferred grouping loss value and the current grouping loss value is less than the grouping threshold, the method 900 will proceed to activity 914 and the system controller 102 determines whether the preferred grouping is stable.

At activity 914, the system controller 102 determines whether the duration of time elapsed since the difference between the preferred grouping loss value and the current grouping loss value exceeded a grouping time threshold. For example, as a new participant enters the meeting, the total combined grouping loss value for each combination of grouping will continuously change until the new participant settles into the meeting and takes a seat, causing the preferred grouping to continuously change until the new participant settles in. The system controller 102 is configured not to continuously update the current grouping until the new participant settles in, preventing multiple interruptions to a remote user's viewing experience. Therefore, if the duration of time elapsed does not exceed the cropping time threshold the method returns to activity 912. If the duration of time elapsed does exceed the grouping time threshold, the method proceeds to activity 916 and the current grouping combination is changed to the preferred grouping.

The preferred grouping loss value is constantly changing as frames are continuously surveyed and the grouping are continuously adjusted during a video conference. The greater the improvement of the preferred grouping, the quicker the grouping should be changed to maximize the viewing experience of a remote user. In various embodiments, to account for this as the difference between the preferred grouping loss value and the grouping threshold increases, the grouping time threshold decreases. Stated differently, the greater the improvement provided by a preferred grouping the faster it is selected.

As described above, the maximum quantity of groupings can be indicated by a user. In some examples, the system controller 102 may be configured to form a maximum number of groupings that is greater than the maximum quantity of groupings indicated by the user. In this case, the system controller 102, based the grouping function, may determine that the viewing experience would improve if the user increased the indicated maximum quantity of groupings. In response, the system controller 102 may recommend the improved maximum quantity of groupings to the user in any suitable method such as a pop-up window. For example, if the user indicated a maximum quantity of groupings is 2, but the system controller 102 determines that a combination of groupings including 3 grouping has a lower total combined grouping loss value then the preferred grouping, the system controller 102 may recommend that the user increase the maximum quantity of groupings.

While the foregoing is directed to embodiments of the present disclosure, other and further embodiments of the disclosure may be devised without departing from the basic scope thereof, and the scope thereof is determined by the claims that follow.

What is claimed is:

1. A computer implemented method, comprising:
generating, by a sensor, a video stream that comprises a series of frames that each include a plurality of objects positioned within a conference environment;
determining the objects captured within at least one frame of the video stream;
assigning one or more croppings to each of the objects in the at least one frame of the video stream, wherein the assigning of the one or more croppings to each of the objects comprises:
determining a plurality of combinations of croppings that include at least one of the objects in the at least one frame; and
assigning a first cropping configuration to each of the determined croppings, wherein each of the assigned first cropping configurations include at least one object; and
adjusting each assigned first cropping configuration to determine a preferred cropping configuration for each of the determined croppings based on a cropping function, wherein the cropping function comprises two or more individual cropping loss values and a respective cropping weight for each of the two or more individual cropping loss values.

2. The method of claim 1, wherein adjusting each first cropping configuration of the croppings comprises:
determining a weighted individual cropping loss value (WICLV) for all of the determined croppings;
determining a total combined cropping loss value for each of the determined croppings, wherein the total combined cropping loss value comprise a sum of one or more WICLVs for each of the determined croppings; and
adjusting each first cropping configuration of the determined croppings and determining a preferred cropping configuration, wherein the preferred cropping configuration has a minimum total combined cropping loss value.

3. The method of claim 2, wherein determining the WICLV of all the determined croppings, comprises:
determining a set of individual cropping loss values for each determined cropping, wherein the set of individual cropping loss values comprise the individual cropping loss values that each correspond to a cropping attribute;
multiplying each of the individual cropping loss values within each set of individual cropping loss values with a cropping weight assigned to each cropping attribute to form weighted individual attribute loss values (WIALVs); and
determining the WICLV of all the croppings in all the combinations of croppings by summing the WIALVs for each of the determined croppings.

4. The method of claim 3, wherein the individual cropping loss values are derived by at least one of the following:
analyzing an amount of asymmetry of an object positioned in each determined cropping;
analyzing an amount of field-of-view (FOV) restriction within each determined cropping;
analyzing an amount of restriction of free space within each determined cropping;
analyzing an amount that each determined cropping is larger than an ideal cropping size; or
analyzing an amount that a hitchhiker is contained with the determined cropping.

5. The method of claim 2, further comprising:
(a) determining that a total combined cropping loss value of the preferred cropping is lower than a total combined cropping loss value of a previously determined preferred cropping;
(b) determining that a duration of time between when the total combined cropping loss value of the preferred cropping was generated and when the total combined cropping loss value of a previously determined preferred cropping was generated has exceeded a cropping time threshold; and
(c) changing the previously determined preferred cropping to the preferred cropping after (a) and (b) are determined.

6. The method of claim 3, further comprising:
determining each combination of groupings of objects within at least one frame of the series of frames; and
determining a preferred grouping for each object based on the determined combination of groupings and a grouping function.

7. The method of claim 6, wherein the combination of groupings of objects are determined based on a maximum quantity of groupings indicated by a user.

8. The method of claim 6, wherein determining each combination of groupings comprises:
determining individual weighted grouping loss values (IWGLVs) for each cropping in the combination of groupings;
determining a total combined grouping loss value by adding the IWGLVs for each cropping of the combination of groupings; and
determining a preferred grouping, wherein the preferred grouping has a minimum total combined grouping loss value, and
wherein determining the IWGLVs for each cropping in the combination of groupings comprises:
determining a set of individual grouping loss values for each cropping of each combination of groupings, the set of individual grouping loss values comprising individual grouping loss values corresponding to a grouping attribute;

multiplying each of the individual grouping loss values within each set of individual grouping loss values with a grouping weight assigned to each grouping attribute to form weighted grouping attribute loss values (IWGALVs); and determining the IWGLVs by adding the IWGALVs.

9. The method of claim 8, wherein the cropping weights and grouping weights are set by a user.

10. The method of claim 8, further comprising:
(a) determining a total combined grouping loss value of the preferred grouping is lower than a total combined grouping loss value of a previously determined preferred grouping;
(b) determining that a duration of time between when the total combined grouping loss value of the preferred grouping was generated and when a total combined grouping loss value of the previously determined preferred grouping has exceeded a grouping time threshold; and
(c) changing the previously determined preferred grouping to the preferred grouping after (a) and (b) are determined.

11. The method of claim 6, wherein the grouping function comprises grouping attributes that are derived by at least one of the following:
analyzing an amount of distance between objects within each of the combination of groupings;
analyzing an amount of space restricted within each of the combination of groupings;
analyzing an amount of asymmetry within each of the combination of groupings;
analyzing an amount of free space within each of the combination of groupings;
analyzing an amount of vertical shift within each of the combination of groupings; and
analyzing whether the preferred grouping exceeds a maximum quantity of groupings.

12. A video conferencing system comprising:
a sensor configured to generate a video stream that comprises a series of frames; and
a controller that comprises a processor and instructions stored in memory, the instructions, when executed by the processor causes the controller to perform a method comprising:
generating, by the sensor, the video stream that comprises the series of frames that each include a plurality of objects positioned within a conference environment;
determining the objects captured within at least one frame of the video stream;
assigning one or more croppings to each of the objects in the at least one frame of the video stream, wherein the assigning of the one or more croppings to each of the objects comprises:
determining a plurality of combinations of croppings that include at least one of the objects in the at least one frame; and
assigning a first cropping configuration to each of the determined croppings, wherein each of the assigned first cropping configurations include at least one object; and
adjusting each assigned first cropping configuration to determine a preferred cropping configuration for each of the determined croppings based on a cropping function, wherein the cropping function comprises two or more individual cropping loss values and a respective cropping weight of each of the two or more individual cropping loss values.

13. The video conferencing system of claim 12, wherein instructions for adjusting each combination of croppings for objects and object groups comprise instructions for:
determining a weighted individual cropping loss value (WICLV) for all the determined croppings;
determining a total combined cropping loss value for each of the determined croppings, wherein the total combined cropping loss value comprise a sum of one or more WICLVs for each of the determined croppings; and
adjusting each first cropping configuration of the combinations of croppings and determining a preferred cropping configuration, wherein the preferred cropping configuration has a minimum total combined cropping loss value.

14. The video conferencing system of claim 13, wherein instructions for determining the WICLV of all the determined croppings comprises:
determining a set of individual cropping loss values for each determined cropping, wherein the set of individual cropping loss values comprise individual cropping loss values that each correspond to a cropping attribute;
multiplying each of the individual cropping loss values within each set of individual cropping loss values with a cropping weight assigned to each cropping attribute to form weighted individual attribute loss values (WIALVs); and
determining the WICLV of all the croppings in all the combinations of croppings by summing the WIALVs of each of the determined croppings.

15. The video conferencing system of claim 14, wherein the instructions further comprise instructions for:
(a) determining that a total combined cropping loss value of the preferred cropping is lower than a total combined cropping loss value of a previously determined preferred cropping;
(b) determining that a duration of time between when the total combined cropping loss value of the preferred cropping was generated and when the total combined cropping loss value of a previously determined preferred cropping was generated has exceeded a cropping time threshold; and
(c) changing the previously determined preferred cropping to the preferred cropping after (a) and (b) are determined.

16. The video conferencing system of claim 15, wherein the instructions further comprise instructions for:
determining each combination of groupings of objects in at least one frame of the series of frames; and
determining a preferred grouping for each object based on the combination of groupings and a grouping function.

17. The video conferencing system of claim 15, wherein the instructions for determining each combination of groupings further comprise instructions for:
determining individual weighted grouping loss values (IWGLVs) for each cropping in the combination of groupings;
determining a total combined grouping loss value by adding the IWGLVs for each cropping of the combination of groupings; and
determining a preferred grouping, wherein the preferred grouping has a minimum combined grouping loss value, and wherein determining the IWGLVs for each cropping in the combination of groupings comprises:

determining a set of individual grouping loss values for each cropping of each combination of groupings, the set of individual grouping loss values comprising individual grouping loss values corresponding to a grouping attribute;

multiplying each of the individual grouping loss values within each set of individual grouping loss values with a grouping weight assigned to each grouping attribute to form weighted grouping attribute loss values (IWGALVs); and determining the IWGLVs by adding the IWGALVs.

18. The video conferencing system of claim 17, wherein the instructions further comprise instructions for:

(a) determining a total combined grouping loss value of the preferred grouping is lower than a total combined grouping loss value of a previously determined preferred grouping;

(b) determining that a duration of time between when the total combined grouping loss value of the preferred grouping was generated and when a total combined grouping loss value of the previously determined preferred grouping has exceeded a grouping time threshold; and (c) changing a previously determined preferred grouping to the preferred grouping after (a) and (b) are determined.

19. The video conferencing system of claim 17, wherein each combination of groupings for objects are determined based on a maximum quantity of groupings indicated by a user, and wherein the cropping weights and the grouping weights are indicated by the user.

20. A method comprising:

determining a quantity of objects in a field of view (FOV) of a sensor;

determining each combination of croppings for objects and object groups in the FOV of the sensor;

adjusting each combination of croppings for the objects and object groups in the FOV of the sensor to determine a preferred cropping for each combination of croppings for objects and object groups based on cropping weights corresponding to different cropping attributes;

determining each combination of groupings for the objects and object groups in the FOV of the sensor based on a maximum quantity of groupings; and adjusting each combination of groupings for objects and object groups to determine a preferred grouping for each combination of groupings for objects and object groups based on grouping weights corresponding to different grouping attributes.

* * * * *